US012628050B2

(12) United States Patent
Mihály et al.

(10) Patent No.: US 12,628,050 B2
(45) Date of Patent: May 12, 2026

(54) TECHNIQUE FOR PERFORMING A CONTEXT TRANSFER

(71) Applicant: Telefonaktiebolaget LM Ericsson (publ), Stockholm (SE)

(72) Inventors: Attila Mihály, Dunakeszi (HU); Maria Cruz Bartolomé Rodrigo, Torremocha de Jarama Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 739 days.

(21) Appl. No.: 17/800,599

(22) PCT Filed: Apr. 1, 2020

(86) PCT No.: PCT/EP2020/059267
§ 371 (c)(1),
(2) Date: Aug. 18, 2022

(87) PCT Pub. No.: WO2021/164892
PCT Pub. Date: Aug. 26, 2021

(65) Prior Publication Data
US 2023/0345311 A1      Oct. 26, 2023

(30) Foreign Application Priority Data
Feb. 18, 2020      (EP) .................................... 20382119

(51) Int. Cl.
*H04W 36/00* (2009.01)
*H04W 36/12* (2009.01)
(Continued)

(52) U.S. Cl.
CPC ... *H04W 36/0033* (2013.01); *H04W 36/0019* (2023.05); *H04W 36/12* (2013.01); *H04W 76/27* (2018.02); *H04W 88/16* (2013.01)

(58) Field of Classification Search
CPC ......... H04W 36/0019; H04W 36/0033; H04W 36/12; H04W 76/27; H04W 88/16
See application file for complete search history.

(56) References Cited

U.S. PATENT DOCUMENTS

| | | | | | |
|---|---|---|---|---|---|
| 10,298,628 | B2* | 5/2019 | Stahl | ................... | H04L 65/1046 |
| 2020/0107213 | A1* | 4/2020 | Park | ..................... | H04W 76/27 |
| 2020/0359440 | A1* | 11/2020 | Qiao | ..................... | H04W 76/11 |

FOREIGN PATENT DOCUMENTS

| | | |
|---|---|---|
| GB | 2552845 A | 2/2018 |
| WO | 2017131565 A1 | 8/2017 |
| WO | 2019035406 A1 | 2/2019 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.
3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, 1-558.

(Continued)

*Primary Examiner* — Marcus Smith
*Assistant Examiner* — Zhaohui Yang
(74) *Attorney, Agent, or Firm* — Weisberg I.P. Law, P.A.

(57) ABSTRACT

A technique for performing a context transfer from a first session management entity to a second session management entity in a mobile communication system is provided, wherein the context transfer concerns a data session associated with a User Equipment, UE, wherein the data session is handled by the first session management entity via a first gateway entity and wherein, after the context transfer, the data session is to be handled by the second session management entity via a second gateway entity. A method implementation of the technique is performed by the second session management entity and comprises, while the UE is in an inactive state, triggering (S302) sending, to the second gateway entity, a session establishment request to establish (Continued)

a new session handling the data session via the second gateway entity, and triggering (S304) providing, to the second gateway entity, an old Internet Protocol, IP, address assigned to the UE as part of an old session handling the data session via the first gateway entity, requesting the second gateway entity to assign the old IP address to the UE as part of the new session, besides a new IP address assigned to the UE as part of the new session, and, when the UE enters an active state from the inactive state, triggering (S306) providing the new IP address to the UE.

18 Claims, 12 Drawing Sheets

(51) Int. Cl.
*H04W 76/27* (2018.01)
*H04W 88/16* (2009.01)

(56) References Cited

OTHER PUBLICATIONS

3GPP, "3rd Generation Partnership Project; Technical Specification Group Services and System Aspects; Procedures for the 5G System; Stage 2 (Release 16)", 3GPP TS 23.502 V16.1.1, Jun. 2019, 1-495.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

DT, et al., "Update SM context transfer procedure", GPP TSG-SA WG2 Meeting #134, S2-1908169, (revision of S2-1908098), Sapporo, Japan, Jun. 24-28, 2019, 1-9.

Narten, T., et al., "Neighbor Discovery for IP version 6 (IPv6)", Network Working Group; Request for Comments: 4861; Obsoletes: 2461; Category: Standards Track, Sep. 2007, 1-97.

* cited by examiner

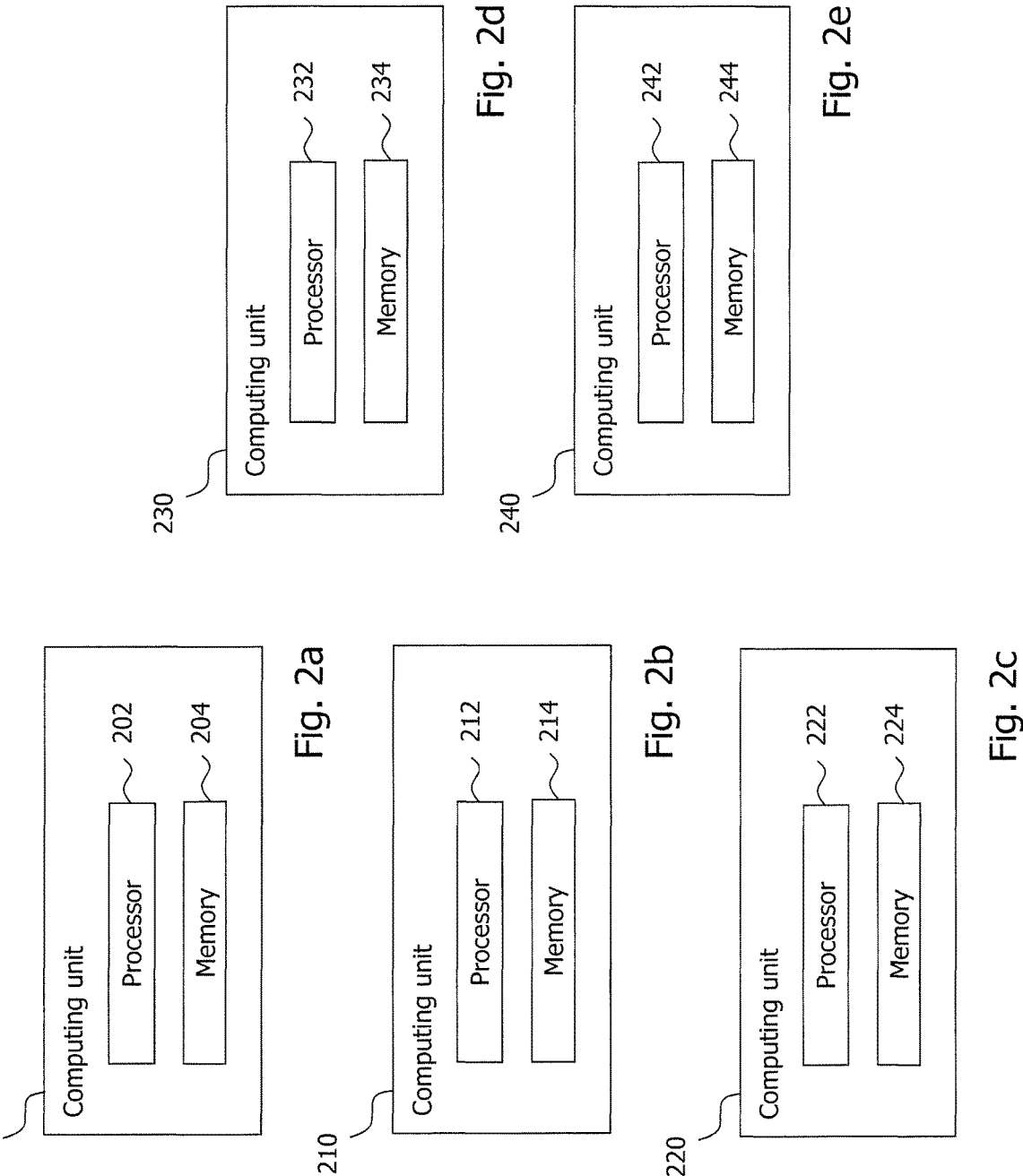

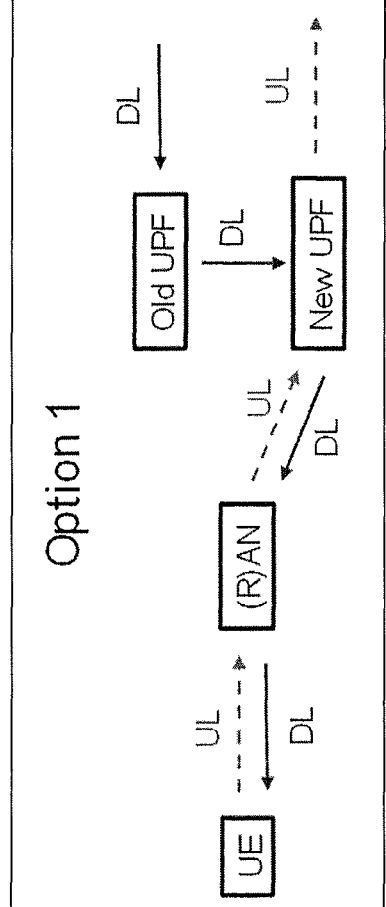
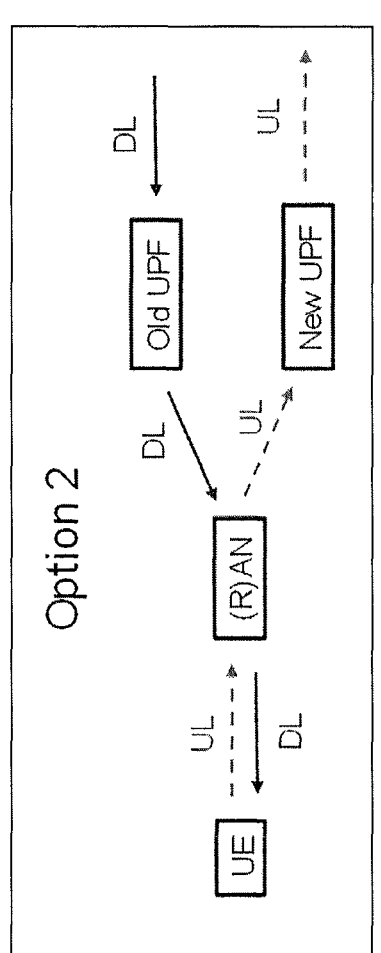
Fig. 4

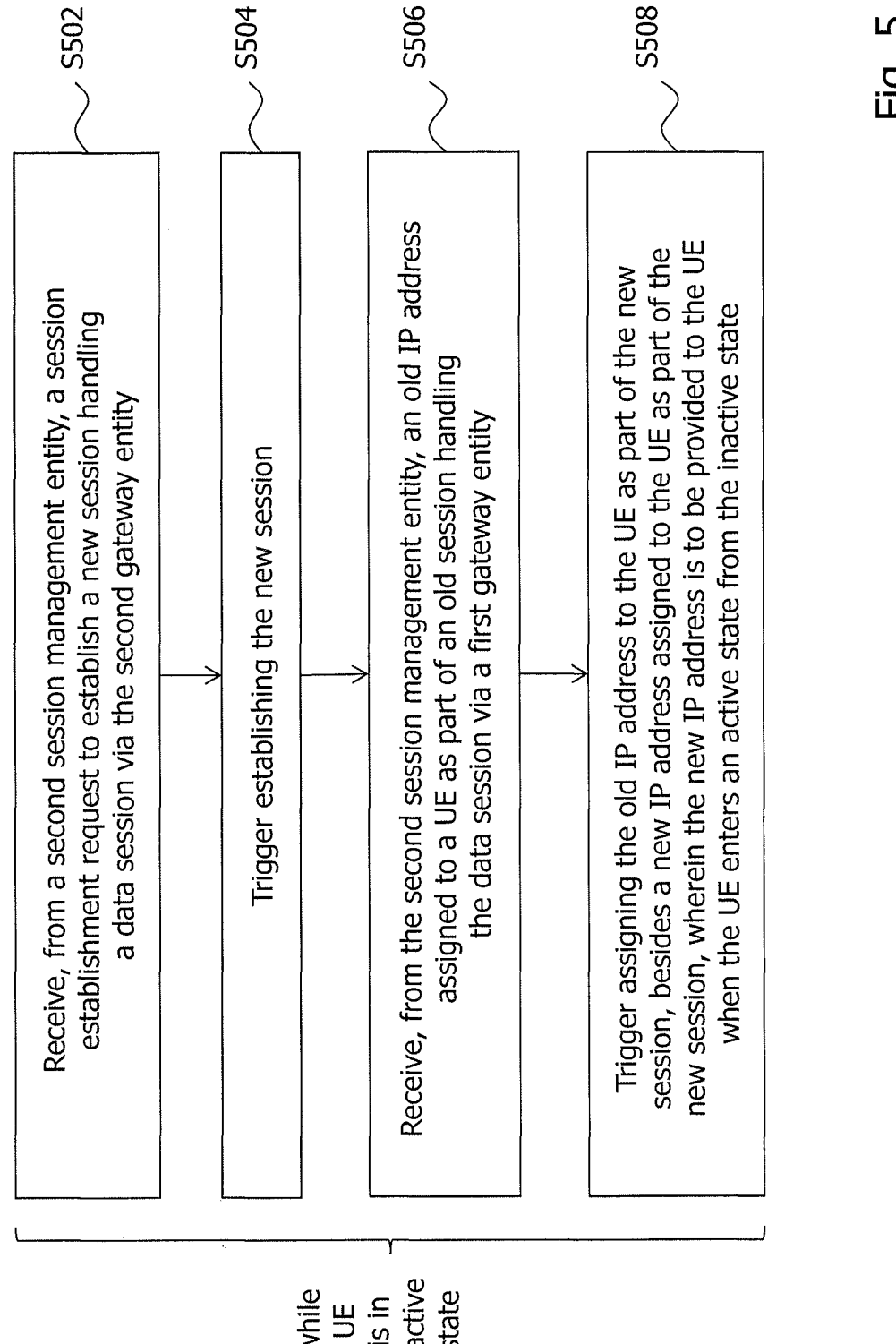

S502

Receive, from a second session management entity, a session establishment request to establish a new session handling a data session via the second gateway entity

S504

Trigger establishing the new session

S506

Receive, from the second session management entity, an old IP address assigned to a UE as part of an old session handling the data session via a first gateway entity

S508

Trigger assigning the old IP address to the UE as part of the new session, besides a new IP address assigned to the UE as part of the new session, wherein the new IP address is to be provided to the UE when the UE enters an active state from the inactive state while UE is in inactive state

Fig. 5

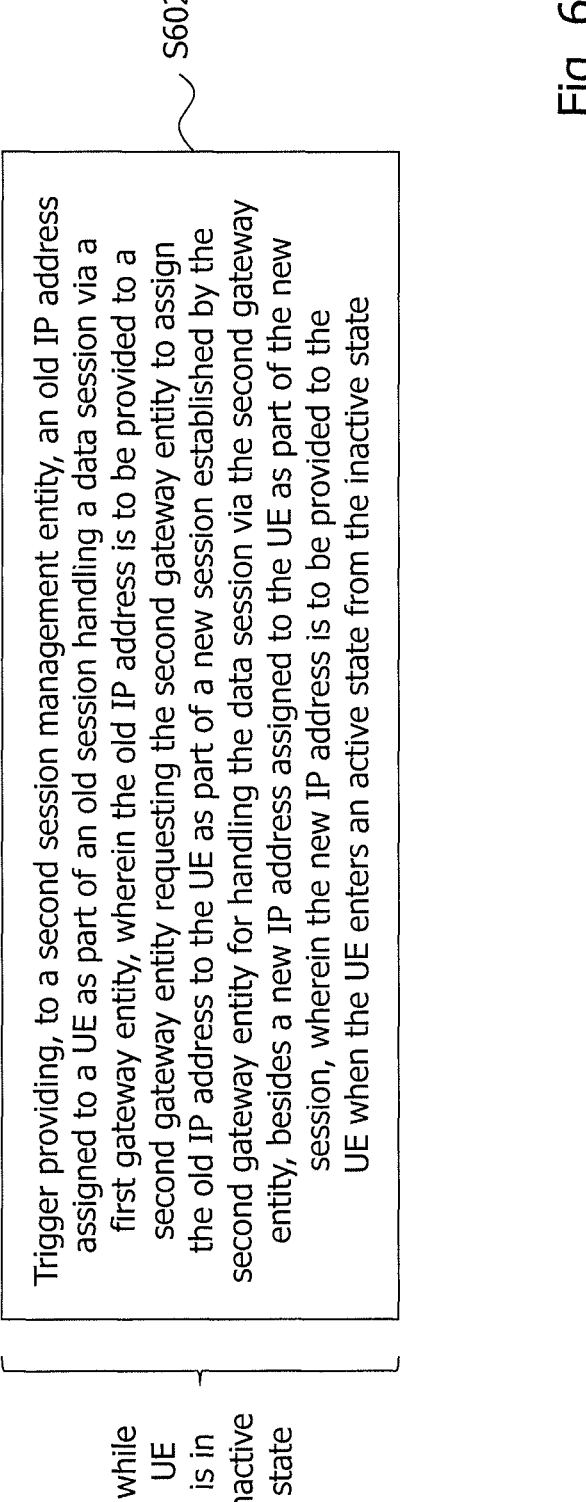

Trigger providing, to a second session management entity, an old IP address assigned to a UE as part of an old session handling a data session via a first gateway entity, wherein the old IP address is to be provided to a second gateway entity requesting the second gateway entity to assign the old IP address to the UE as part of a new session established by the second gateway entity for handling the data session via the second gateway entity, besides a new IP address assigned to the UE as part of the new session, wherein the new IP address is to be provided to the UE when the UE enters an active state from the inactive state

S602 while UE is in inactive state

Fig. 6

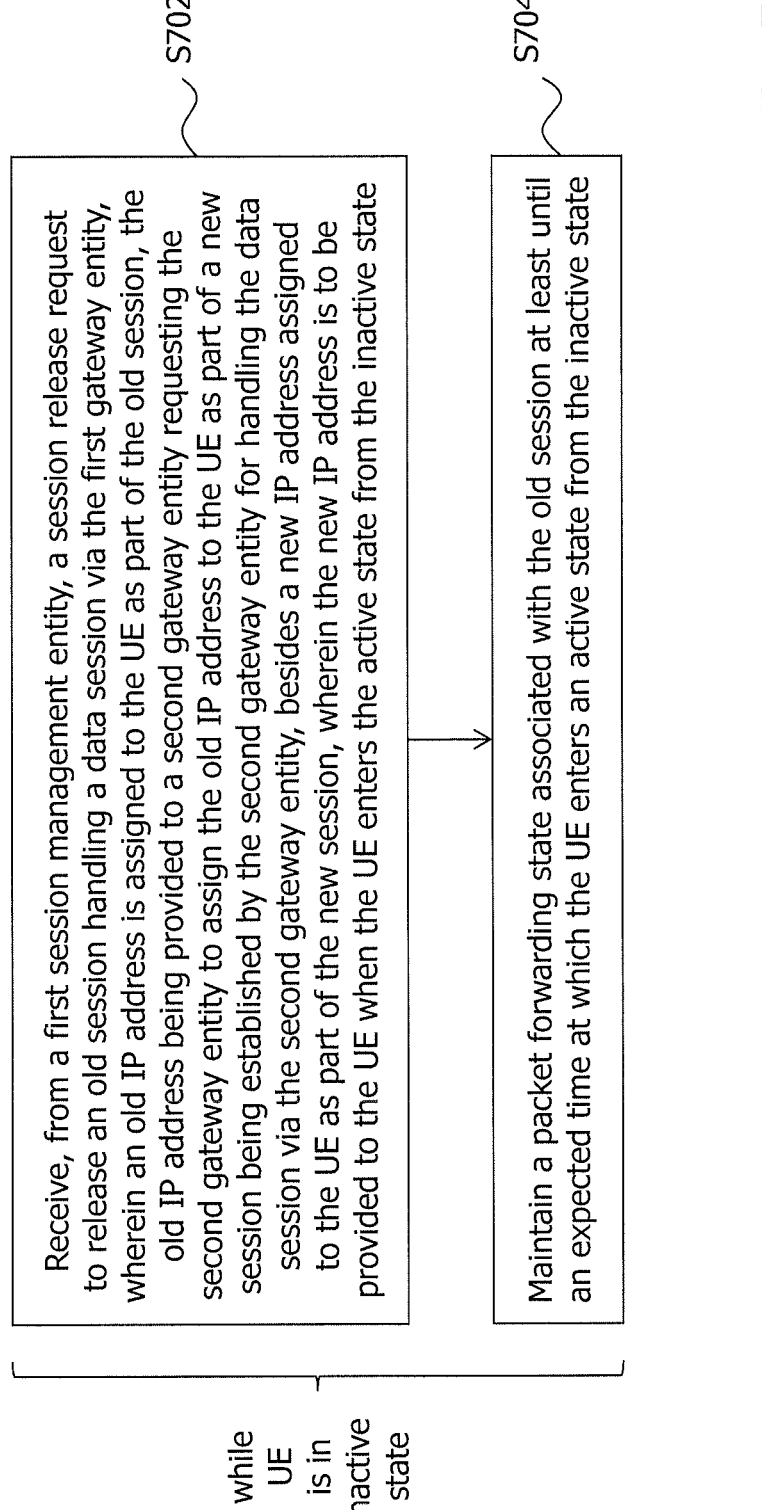

Receive, from a first session management entity, a session release request to release an old session handling a data session via the first gateway entity, wherein an old IP address is assigned to the UE as part of the old session, the old IP address being provided to a second gateway entity requesting the second gateway entity to assign the old IP address to the UE as part of a new session being established by the second gateway entity for handling the data session via the second gateway entity, besides a new IP address assigned to the UE as part of the new session, wherein the new IP address is to be provided to the UE when the UE enters the active state from the inactive state

S702

Maintain a packet forwarding state associated with the old session at least until an expected time at which the UE enters an active state from the inactive state

S704 while UE is in inactive state

Fig. 7

Trigger sending, to a second session management entity, a context transfer request initiating a context transfer, the context transfer request including a gateway change indication indicating a necessity of changing a first gateway entity to another gateway entity when carrying out the context transfer

S802 while UE is in inactive state

1. Context transfer request received

2. Infer that new UPF has to be used

3. Get context from old SMF(indicate UPF change)

4. Select new UPF and set up N4 session (indicate old IP address)

5. Wait until UE becomes CM-Connected and preferably not generating or receiving traffic 6. Provision UE with new IP address

TECHNIQUE FOR PERFORMING A CONTEXT TRANSFER

TECHNICAL FIELD

The present disclosure generally relates to mobile communication systems. In particular, a technique for performing a context transfer from a first session management entity to a second session management entity in a mobile communication system is presented. The technique may be embodied in methods, computer programs, apparatuses and systems.

BACKGROUND

Mobile communication systems of the fifth generation (5G), especially their Core Network (CN) architectures, generally make use of the Service Based Architecture (SBA) paradigm in which each Network Function (NF) may provide—as a "producer"—one or more "services" to one or more "consumers". NF services represent self-contained functionalities that can be modified in an isolated manner without affecting others. In order to cover the possibility of transferring context/session data from a source NF service to a target NF service (e.g., of a different vendor), to thereby be able to resume processing in the target NF service, standardization of a context transfer procedure was taken into consideration in recent 3GPP discussions.

Besides some generic operations for context transfer, a method for Session Management Function (SMF) context transfer has been agreed which is illustrated in FIGS. 1a and 1b (e.g., described in 3GPP Change Request S2-1908169 "Update SM context transfer procedure"). As shown in the figure, in step 1, Session Management (SM) context transfer is initiated at the old SMF, e.g., triggered by Operations & Management (O&M), and, in step 2, the old SMF may subscribe to events at the Access and Mobility Management Function (AMF) to be notified when the User Equipment (UE) status enters the CM-IDLE state or the CM-CONNECTED with Radio Resource Control (RRC) inactive state, as defined in 3GPP TS 23.501, such as 3GPP TS 23.501 v16.1.0, for example. The AMF may then wait until the UE becomes CM-IDLE or RRC inactive (i.e., enters an inactive state in the sense of the present disclosure, as will be discussed further below) and send a corresponding notification to the old SMF in step 3. In step 4, the old SMF triggers the actual context transfer procedure by sending an Nsmf_PDUSession_SMContextStatusNotify message to the AMF including an SMF transfer indication as well as a new SMF ID (or SMF set ID) and a Protocol Data Unit (PDU) session ID of the current PDU session associated with the UE. In step 5, the AMF uses the new SMF ID (or SMF set ID) to select the new SMF and sends an Nsmf_PDUSession_CreateSMContext request to the new SMF, requesting the new SMF to establish a context with the same PDU session ID. In step 6, the new SMF sends an Nsmf_PDUSession_ContextRequest request to the old SMF to obtain the context for this PDU session. In step 7, the old SMF releases the N4 session established with the User Plane Function (UPF) (the N4 session being the session established on the N4 interface between the SMF and the UPF which handles the PDU session) by sending a flag notifying the UPF about the expected reestablishment of the N4 session for the same PDU session. In step 8, the old SMF sends an Nsmf_PDUSession_ContextRequest response to the new SMF with the requested SM context in response to the request of step 6. The SM context may include the Internet Protocol (IP)

address of the UE if the PDU session is of type IPv4, IPv6 or IPv4v6, for example. If the new SMF is able to transfer the SM context, the new SMF may set up a new policy association towards the Policy Control Function (PCF) in step 9. In step 10.1, the UPF may receive an N4 session establishment request from the new SMF for the same PDU session and, in step 10.2, the new SMF may perform a reestablishment of the N4 session with the UPF (establishing a new N4 session), wherein all information related to the N4 session of the old SMF that is not used by the N4 session of the new SMF is removed from the UPF. In step 11, the new SMF may register at the User Data Management (UDM) function and subscribe to subscription changes for the UE in step 12. As the context transfer is then complete, the new SMF sends, in step 13, an Nsmf_PDUSession_CreateSMContext response to the AMF in response to the request of step 5 and, in step 14, the UDM notifies the old SMF that it is deregistered for the PDU session. If an error occurred in the above context transfer, the old SMF may optionally reestablish the N4 session with the UPF in step 15 and the procedure may end here. Otherwise, in step 16, the old SMF may remove its policy association with the PCF and, finally, in step 17, the old SMF releases all internal resources corresponding to the PDU session. Subscribers to SMContextStatusNotify for the transferred SM context (see step 4) are notified of the context transfer and optionally of the new location of the transferred SM context.

The above context transfer procedure does not deal with cases when the context transfer cannot be achieved with the same UPF, however, i.e., with cases when the UPF (e.g., the anchor UPF) also needs to be changed. These scenarios may occur, for example, when the UE moves into another service area which cannot be served by the old SMF anymore, or when the data center (DC) where the old SMF resides needs to be changed (e.g., for reasons such as introducing a new DC for load balancing reasons, or due to a business decision to change the hosting DC, etc.). Such UPF changes typically necessitate changes of the UE IP addresses because all UPFs generally handle a disjoint pool of (non-anycast) IP addresses. When a UPF change requires a change of the UE IP address, the affected IP address is transferred (or "moved") to the new UPF, which requires a number of O&M actions, including reconfiguring the IP addresses (address ranges) the old/new SMF/UPFs handle as well as reconfiguring the routings so that the UE IP address is reachable. All this is to be done in an iterative manner, i.e., the already transferred addresses should be reachable at the new UPF (with a new UE IP address), but the others should still be reachable at the old UPF. It will be understood that these O&M actions can become quite complex.

According to a simpler approach, a new IP address could directly be allocated for the UE PDU session from the pool of the new SMF/UPF. However, new IP address allocation may be problematic because it generally implies a notification to the UE, which may cause problems with long-lived IP sessions with idle UEs that would be awakened by such notification, such as Machine Type Communication (MTC) devices in Internet of Things (IoT) environments, for example. To avoid such undesirable behavior, it may be considered to avoid the UE IP address change in general, which could be achieved by permanently assigning the UE IP address to the new UPF by using O&M reconfigurations (of SMF/UPF and routing devices), for example. However, this may not always be a feasible solution, because IP addresses may be bound to DCs, or a fast change may be needed to move the UE, etc.

SUMMARY

Accordingly, there is a need for a technique for performing context transfer involving a gateway change which avoids one or more of these problems, or other problems.

According to a first aspect, a method for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The method is performed by the second session management entity and comprises, while the UE is in an inactive state, triggering sending, to the second gateway entity, a session establishment request to establish a new session handling the data session via the second gateway entity, and triggering providing, to the second gateway entity, an old IP address assigned to the UE as part of an old session handling the data session via the first gateway entity, requesting the second gateway entity to assign the old IP address to the UE as part of the new session, besides a new IP address assigned to the UE as part of the new session, and, when the UE enters an active state from the inactive state, triggering providing the new IP address to the UE.

In the inactive state, the UE may be in at least one of an unconnected Non-Access Stratum (NAS) state and an inactive RRC state and, in the active state, the UE may be in a connected NAS state and in an active RRC state. Triggering providing the new IP address to the UE may be performed after the UE has stopped exchanging traffic. In one variant, the first gateway entity may maintain forwarding downlink (DL) packets directed to the old IP address according to a forwarding rule by which DL packets directed to the old IP address have been forwarded prior to providing the old IP address to the second gateway entity.

In another variant, the method may further comprise, while the UE is in the inactive state, receiving, from the second gateway entity, tunnel endpoint information regarding the second gateway entity, and triggering providing the tunnel endpoint information to the first gateway entity, optionally via the first session management entity, requesting the first gateway entity to forward DL packets directed to the old IP address to the second gateway entity for further delivery to the UE. When the tunnel endpoint information is provided to the first gateway entity via the first session management entity, the tunnel endpoint information may be included in a context request for the data session sent from the second session management entity to the first session management entity. The context request for the data session may include a gateway change indication indicating to the first session management entity to request the first gateway entity to forward DL packets directed to the old IP address to the second gateway entity for further delivery to the UE. The method may further comprise, while the UE is in the inactive state, triggering providing the tunnel endpoint information to a mobility management entity requesting the mobility management entity to configure, using the tunnel endpoint information, an Access Network (AN) node to forward uplink (UL) packets arriving from the UE to the second gateway entity.

The method may further comprise, while the UE is in the inactive state, triggering providing a time indication to the first gateway entity, optionally via the first session management entity, indicating a maintenance time until which a packet forwarding state associated with the old session is at least to be maintained by the first gateway entity. The maintenance time may correspond to an expected time at which the UE enters the active state from the inactive state. The old IP address may be provided to the second gateway entity in a session modification request sent to the second gateway entity to modify the new session. The old IP address may be received from the first session management entity, optionally in a context of the data session received from the first session management entity.

The method may further comprise, while the UE is in the inactive state and prior to triggering sending the session establishment request to the second gateway entity, triggering determining whether the context transfer necessitates changing the first gateway entity to another gateway entity operable with the second session management entity. Triggering determining whether the context transfer necessitates changing the first gateway entity to another gateway entity may include one of triggering determining a necessity of changing the first gateway entity to another gateway entity based on a gateway change indication included in a message received by the second session management entity, and triggering determining a necessity of changing the first gateway entity to another gateway entity based on a configuration of the second session management entity. The message received by the second session management entity may be a context transfer request. When the new IP address is an IPv6 address, triggering providing the new IP address to the UE may include triggering notifying the UE, optionally via the second gateway entity, that a new IPv6 prefix is available. When the new IP address is an IPv4 address, triggering providing the new IP address to the UE may include triggering requesting a mobility management entity to select the second session management entity when performing a reestablishment procedure for the data session, and triggering performing a reestablishment procedure for the data session.

According to a second aspect, a method for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The method is performed by the second gateway entity and comprises, while the UE is in an inactive state, receiving, from the second session management entity, a session establishment request to establish a new session handling the data session via the second gateway entity, triggering establishing the new session, receiving, from the second session management entity, an old IP address assigned to the UE as part of an old session handling the data session via the first gateway entity, and triggering assigning the old IP address to the UE as part of the new session, besides a new IP address assigned to the UE as part of the new session, wherein the new IP address is to be provided to the UE when the UE enters an active state from the inactive state.

The method according to the second aspect defines a method from a second gateway entity's perspective which may be complementary to the method according to the first aspect. As in the method of the first aspect, in the inactive state, the UE may be in at least one of an unconnected NAS state and an inactive RRC state and, in the active state, the UE may be in a connected NAS state and in an active RRC state. The new IP address may be to be provided to the UE after the UE has stopped exchanging traffic. In one variant, the first gateway entity may maintain forwarding DL packets directed to the old IP address according to a forwarding rule by which DL packets directed to the old IP address have been forwarded prior to receiving the old IP address from the second session management entity. In another variant, the method may further comprise, while the UE is in the inactive state, triggering providing tunnel endpoint information regarding the second gateway entity to the second session management entity, wherein the tunnel endpoint information is to be provided to the first gateway entity, optionally via the first session management entity, requesting the first gateway entity to forward DL packets directed to the old IP address to the second gateway entity for further delivery to the UE. The method may further comprise receiving, from the first gateway entity, DL packets directed to the old IP address, and triggering delivering the DL packets to the UE. The old IP address may be received from the second session management entity in a session modification request to modify the new session.

According to a third aspect, a method for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The method is performed by the first session management entity and comprises, while the UE is in an inactive state, triggering providing, to the second session management entity, an old IP address assigned to the UE as part of an old session handling the data session via the first gateway entity, wherein the old IP address is to be provided to the second gateway entity requesting the second gateway entity to assign the old IP address to the UE as part of a new session established by the second gateway entity for handling the data session via the second gateway entity, besides a new IP address assigned to the UE as part of the new session, wherein the new IP address is to be provided to the UE when the UE enters an active state from the inactive state.

The method according to the third aspect defines a method from a first session management entity's perspective which may be complementary to the method according to the first aspect. As in the method of the first aspect, in the inactive state, the UE may be in at least one of an unconnected NAS state and an inactive RRC state and, in the active state, the UE may be in a connected NAS state and in an active RRC state. The new IP address may be to be provided to the UE after the UE has stopped exchanging traffic. In one variant, the first gateway entity may maintain forwarding DL packets directed to the old IP address according to a forwarding rule by which DL packets directed to the old IP address have been forwarded prior to providing the old IP address to the second gateway entity.

In another variant, the method may further comprise, while the UE is in the inactive state, receiving, from the second session management entity, tunnel endpoint information regarding the second gateway entity, and triggering providing the tunnel endpoint information to the first gateway entity requesting the first gateway entity to forward DL packets directed to the old IP address to the second gateway entity for further delivery to the UE. The tunnel endpoint information may be included in a context request for the data session sent from the second session management entity to the first session management entity. The context request for the data session may include a gateway change indication indicating to the first session management entity to request the first gateway entity to forward the packets directed to the old IP address to the second gateway entity for further delivery to the UE. The tunnel endpoint information may be provided to the first gateway entity in a session release request to release the old session.

The method may further comprise, while the UE is in the inactive state, receiving, from the second session management entity, a time indication indicating a maintenance time until which a packet forwarding state associated with the old session is at least to be maintained by the first gateway entity, and triggering providing the time indication to the first gateway entity. The maintenance time may correspond to an expected time at which the UE enters the active state from the inactive state. The old IP address may be sent to the second session management entity in a context of the data session. The method may further comprise, while the UE is in the inactive state and prior to providing the old IP address to the second session management entity, triggering determining whether the context transfer necessitates changing the first gateway entity to another gateway entity operable with the second session management entity. The method may further comprise, while the UE is in the inactive state, when it is determined that the context transfer necessitates changing the first gateway entity to another gateway entity, triggering sending a message to the second session management entity, the message including a gateway change indication.

According to a fourth aspect, a method for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The method is performed by the first gateway entity and comprises, while the UE is in an inactive state, receiving, from the first session management entity, a session release request to release an old session handling the data session via the first gateway entity, wherein an old IP address is assigned to the UE as part of the old session, the old IP address being provided to the second gateway entity requesting the second gateway entity to assign the old IP address to the UE as part of a new session being established by the second gateway entity for handling the data session via the second gateway entity, besides a new IP address assigned to the UE as part of the new session, wherein the new IP address is to be provided to the UE when the UE enters the active state from the inactive state, and maintaining a packet forwarding state associated with the old session at least until an expected time at which the UE enters an active state from the inactive state.

The method according to the fourth aspect defines a method from a first gateway entity's perspective which may be complementary to the method according to the third aspect. As in the method of the third aspect, in the inactive state, the UE may be in at least one of an unconnected NAS state and an inactive RRC state and, in the active state, the UE may be in a connected NAS state and in an active RRC state. The new IP address may be to be provided to the UE after the UE has stopped exchanging traffic. In one variant, the method may further comprise maintaining forwarding DL packets directed to the old IP address according to a forwarding rule by which DL packets directed to the old IP address have been forwarded prior to providing the old IP address to the second gateway entity.

In another variant, the method may further comprise, while the UE is in the inactive state, receiving, from the first session management entity, tunnel endpoint information regarding the second gateway entity, and establishing a tunnel to the second gateway entity based on the tunnel endpoint information to forward packets directed to the old IP address to the second gateway entity for further delivery to the UE. The tunnel endpoint information may be received in the session release request. The method may further comprise receiving DL packets directed to the old IP address, and triggering forwarding the DL packets to the second gateway entity via the tunnel for further delivery to the UE. The method may further comprise, while the UE is in the inactive state, receiving a time indication from the first session management entity indicating a maintenance time until which a packet forwarding state associated with the old session is at least to be maintained, wherein the packet forwarding state associated with the old session may be maintained until the maintenance time. The maintenance time may correspond to the expected time at which the UE enters the active state from the inactive state.

According to a fifth aspect, a method for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The method is performed by a mobility management entity of the mobile communication system and comprises, while the UE is in an inactive state, triggering sending, to the second session management entity, a context transfer request initiating the context transfer, the context transfer request including a gateway change indication indicating a necessity of changing the first gateway entity to another gateway entity when carrying out the context transfer.

The method according to the fifth aspect defines a method from a mobility management entity's perspective which may be complementary to the method according to the first aspect. As in the method of the first aspect, in the inactive state, the UE may be in at least one of an unconnected NAS state and an inactive RRC state. The method may further comprise, when the UE enters an active state from the inactive state, receiving, from the second session management entity, a request to select the second session management entity when performing a reestablishment procedure for the data session. In the active state, the UE may be in a connected NAS state and in an active RRC state. The method may further comprise, while the UE is in the inactive state, receiving, from the second session management entity, tunnel endpoint information regarding the second gateway entity, and triggering configuring, using the tunnel endpoint information, an AN node to forward UL packets arriving from the UE to the second gateway entity.

According to a seventh aspect, a computer program product is provided. The computer program product comprises program code portions for performing the method of at least one of the first, second, third, fourth and fifth aspect when the computer program product is executed on one or more computing devices (e.g., a processor or a distributed set of processors). The computer program product may be stored on a computer readable recording medium, such as a semiconductor memory, DVD, CD-ROM, and so on.

According to an eighth aspect, a computing unit configured to execute a second session management entity for performing a context transfer from a first session management entity to the second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The computing unit comprises at least one processor and at least one memory, wherein the at least one memory contains instructions executable by the at least one processor such that the second session management entity is operable to perform any of the method steps presented herein with respect to the first aspect.

According to a ninth aspect, a computing unit configured to execute a second gateway entity for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via the second gateway entity. The computing unit comprises at least one processor and at least one memory, wherein the at least one memory contains instructions executable by the at least one processor such that the second gateway entity is operable to perform any of the method steps presented herein with respect to the second aspect.

According to a tenth aspect, a computing unit configured to execute a first session management entity for performing a context transfer from the first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The computing unit comprises at least one processor and at least one memory, wherein the at least one memory contains instructions executable by the at least one processor such that the first session management entity is operable to perform any of the method steps presented herein with respect to the third aspect.

According to an eleventh aspect, a computing unit configured to execute a first gateway entity for performing a context transfer from a first session management entity to a second session management entity in a mobile communication system is provided, wherein the context transfer concerns a data session associated with a UE, wherein the data session is handled by the first session management entity via the first gateway entity and wherein, after the context transfer, the data session is to be handled by the second session management entity via a second gateway entity. The computing unit comprises at least one processor and at least one memory, wherein the at least one memory contains instructions executable by the at least one processor such that the first gateway entity is operable to perform any of the method steps presented herein with respect to the fourth aspect.

According to a twelfth aspect, computing unit configured to execute a mobility management entity for performing a context transfer from a first session management entity to a second session management entity in a mobile communication system is provided, wherein the context transfer concerns a data session associated with a UE, wherein the data session is handled by the first session management entity via a first gateway entity and wherein, after the context transfer, the data session is to be handled by the second session management entity via a second gateway entity. The computing unit comprises at least one processor and at least one memory, wherein the at least one memory contains instructions executable by the at least one processor such that the mobility management entity is operable to perform any of the method steps presented herein with respect to the fifth aspect.

According to a thirteenth aspect, there is provided a system comprising a computing unit according to the eighth aspect, a computing unit according to the ninth aspect, a computing unit according to the tenth aspect, a computing unit according to the eleventh aspect, and, optionally, a computing unit according to the twelfth aspect.

BRIEF DESCRIPTION OF THE DRAWINGS

Implementations of the technique presented herein are described herein below with reference to the accompanying drawings, in which:

FIGS. 2a to 2e illustrate exemplary compositions of a computing unit configured to execute a second session management entity, a computing unit configured to execute a second gateway entity, a computing unit configured to execute a first session management entity, a computing unit configured to execute a first gateway entity, and a computing unit configured to execute a mobility management entity according to the present disclosure;

FIG. 4 illustrates possible implementations for forwarding packets during the context transfer procedure according to the present disclosure;

FIG. 5 illustrates a method which may be performed by the second gateway entity according to the present disclosure;

FIG. 6 illustrates a method which may be performed by the first session management entity according to the present disclosure;

FIG. 7 illustrates a method which may be performed by the first gateway entity according to the present disclosure;

DETAILED DESCRIPTION

Figure 1A:
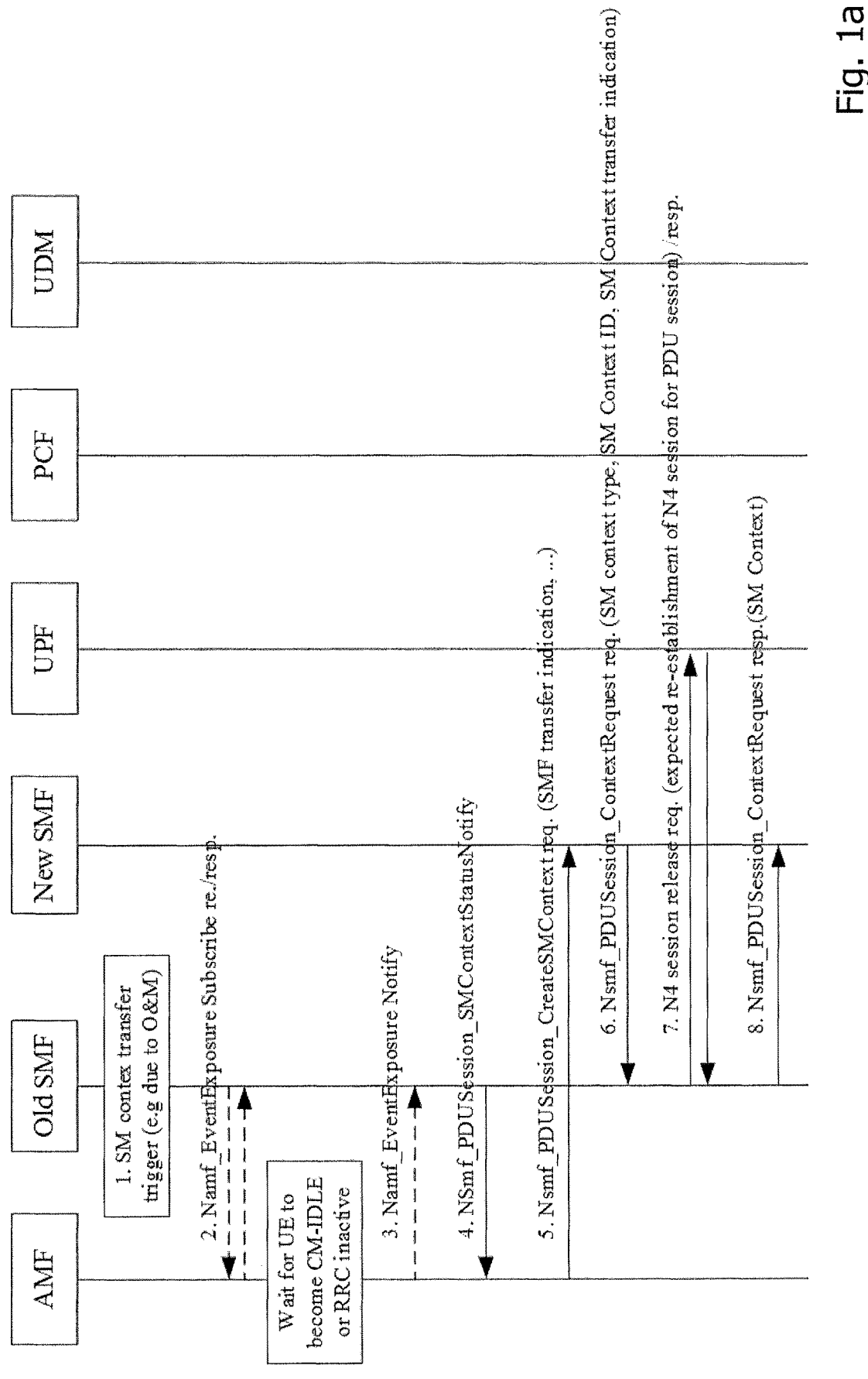
FIGS. 1a and 1b illustrate a method for SMF context transfer as agreed in 3GPP.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 2a schematically illustrates an exemplary composition of a computing unit 200 configured to execute a second session management entity for performing a context transfer from a first session management entity to the second session management entity in a mobile communication system, wherein the context transfer concerns a data session associated with a UE, wherein the data session is handled by the first session management entity via a first gateway entity and wherein, after the context transfer, the data session is to be handled by the second session management entity via a second gateway entity. The computing unit 200 comprises at least one processor 202 and at least one memory 204, wherein the at least one memory 204 contains instructions executable by the at least one processor 202 such that the computing unit 200 is operable to carry out the method steps described herein below with reference to the second session management entity.

FIG. 2b schematically illustrates an exemplary composition of a computing unit 210 configured to execute a second gateway entity for performing a context transfer from a first session management entity to a second session management entity in a mobile communication system, wherein the context transfer concerns a data session associated with a UE, wherein the data session is handled by the first session management entity via a first gateway entity and wherein, after the context transfer, the data session is to be handled by the second session management entity via the second gateway entity. The computing unit 210 comprises at least one processor 212 and at least one memory 214, wherein the at least one memory 214 contains instructions executable by the at least one processor 212 such that the computing unit 210 is operable to carry out the method steps described herein below with reference to the second gateway entity.

FIG. 2c schematically illustrates an exemplary composition of a computing unit 220 configured to execute a first session management entity for performing a context transfer from the first session management entity to a second session management entity in a mobile communication system, wherein the context transfer concerns a data session associated with a UE, wherein the data session is handled by the first session management entity via a first gateway entity and wherein, after the context transfer, the data session is to be handled by the second session management entity via a second gateway entity. The computing unit 220 comprises at least one processor 222 and at least one memory 224, wherein the at least one memory 224 contains instructions executable by the at least one processor 222 such that the computing unit 220 is operable to carry out the method steps described herein below with reference to the first session management entity.

FIG. 2d schematically illustrates an exemplary composition of a computing unit 230 configured to execute a first gateway entity for performing a context transfer from a first session management entity to a second session management entity in a mobile communication system, wherein the context transfer concerns a data session associated with a UE, wherein the data session is handled by the first session management entity via the first gateway entity and wherein, after the context transfer, the data session is to be handled by the second session management entity via a second gateway entity. The computing unit 230 comprises at least one processor 232 and at least one memory 234, wherein the at least one memory 234 contains instructions executable by the at least one processor 232 such that the computing unit 230 is operable to carry out the method steps described herein below with reference to the first gateway entity.

FIG. 2e schematically illustrates an exemplary composition of a computing unit 240 configured to execute a mobility management entity for performing a context transfer from a first session management entity to a second session management entity in a mobile communication system, wherein the context transfer concerns a data session associated with a UE, wherein the data session is handled by the first session management entity via a first gateway entity and wherein, after the context transfer, the data session is to be handled by the second session management entity via a second gateway entity. The computing unit 240 comprises at least one processor 242 and at least one memory 244, wherein the at least one memory 244 contains instructions executable by the at least one processor 242 such that the computing unit 240 is operable to carry out the method steps described herein below with reference to the mobility management entity.

It will be understood that each of the computing unit 200, the computing unit 210, the computing unit 220, the computing unit 230 and the computing unit 240 may be implemented on a physical computing unit or a virtualized computing unit, such as a virtual machine, for example. It will further be appreciated that each of the computing unit 200, the computing unit 210, the computing unit 220, the computing unit 230 and the computing unit 240 may not necessarily be implemented on a standalone computing unit, but may be implemented as components—realized in software and/or hardware—residing on multiple distributed computing units as well, such as in a cloud computing environment, for example.

Figure 3:
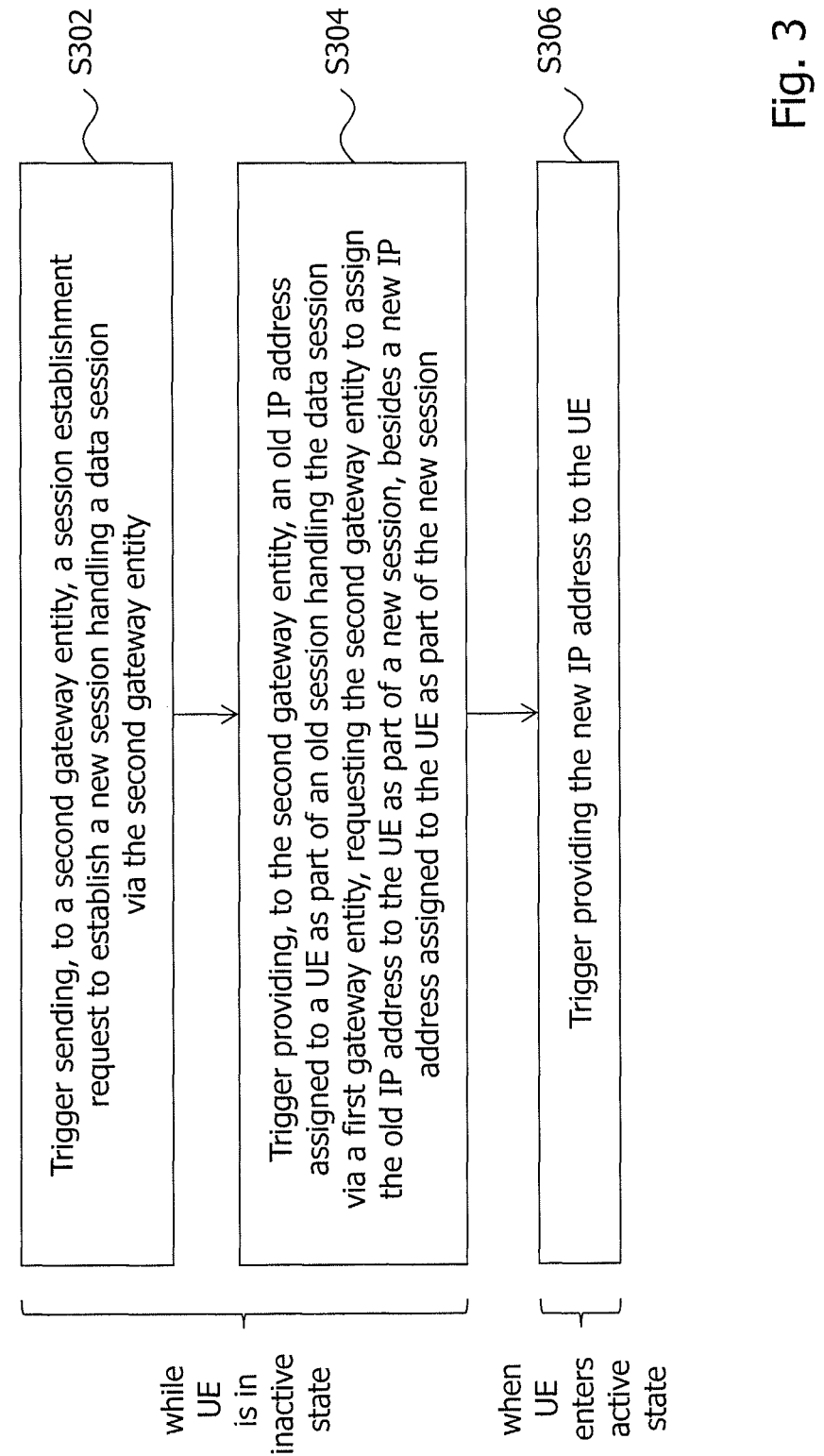
FIG. 3 illustrates a method which may be performed by the second session management entity according to the present disclosure.

FIG. 3 illustrates a method which may be performed by the second session management entity executed on the computing unit 200 according to the present disclosure. The method is dedicated to performing a context transfer from a first session management entity (e.g., the first session management entity executed on the computing unit 220) to the second session management entity in a mobile communication system, wherein the context transfer concerns a data session associated with a UE, wherein the data session is handled by the first session management entity via a first gateway entity (e.g., the first gateway entity executed on the computing unit 230) and wherein, after the context transfer, the data session is to be handled by the second session management entity via a second gateway entity (e.g., the second gateway entity executed on the computing unit 210).

In step S302, the second session management entity may trigger sending, to the second gateway entity, a session establishment request to establish a new session handling the data session via the second gateway entity. In step S304, the second session management entity may trigger providing, to the second gateway entity, an old IP address assigned to the UE as part of an old session handling the data session via the first gateway entity, requesting the second gateway entity to assign the old IP address to the UE as part of the new session, besides a new IP address assigned to the UE as part of the new session. Steps S302 and S304 may be performed while the UE is in an inactive state. When the UE enters an active state from the inactive state, the second session management entity may trigger, in step S306, providing the new IP address to the UE.

As described above, a context transfer from the first session management entity to the second session management entity may necessitate a change of the underlying gateway entity (e.g., the anchor UPF) in situations, such as when the UE moves into another service area which cannot be served by the first session management entity anymore, or when the DC where the first session management entity resides needs to be changed (e.g., for reasons such as introducing a new DC for load balancing reasons, or due to a business decision to change the hosting DC, etc.). Before the context transfer, the data session may thus be handled by the first session management entity via the first gateway entity and, after the context transfer, the data session is to be handled by the second session management entity via the second gateway entity. Before the context transfer, the data session may be handled by an old session established on an interface between the first session management entity and the first gateway entity, wherein an old IP address may be assigned to the UE as part of the old session. In order to then perform the context transfer, a new session handling the data session via the second gateway entity may be established in accordance with step S302. The new session may be a session established on an interface between the second session management entity and the second gateway entity, wherein a new IP address may be assigned to the UE as part of the new session. In step S304, the old IP address may then be assigned, besides the new IP address, to the UE as part of the new session in order to associate both the old IP address and the new IP address with the UE in the new session.

By requesting the second gateway entity to assign the old IP address, besides the new IP address, to the UE as part of the new session, the second gateway entity may (e.g., temporarily) handle packets with the old IP address and packets with the new IP address in the same way, e.g., until the context transfer from the first session management entity to the second session management entity is complete. The second gateway entity may thus forward incoming packets along the same routes in both DL and UL directions, no matter whether the packets are directed to or originated from the old IP address or the new IP address. In this way, the change from the first gateway entity to the second gateway entity as the gateway entity handling the data session may be achieved without (or at least with reduced) packet loss. Moreover, by performing these actions while the UE is in an inactive state and by not providing the new IP address to the UE until the UE enters the active state from the inactive state in accordance with step S306, the UE may not be notified about the change from the old IP address to the new IP address until the UE is in an active state, so that reactivation of the UE caused by the context transfer may generally be avoided. The notification of the UE about the IP address change may in other words be delayed as long as the UE is in an inactive state to thereby avoid awaking the UE because of the context transfer.

The inactive state may be a state in which the UE is in an unconnected NAS state or in an inactive RRC state. The unconnected NAS state may correspond to a state in which the UE has no established NAS signaling connection with a CN node of the mobile communication system, such as a mobility management entity of the mobile communication system, like an AMF in case of a 5G network, for example.

As such, the unconnected NAS state may correspond to a CM-IDLE state as defined in 3GPP TS 23.501, such as 3GPP TS 23.501 v16.1.0 or successor versions thereof. The inactive RRC state may correspond to a state in which the RRC connection of the UE is suspended (e.g., but not entirely released) and, as such, the inactive RRC state may correspond to an RRC_INACTIVE state as defined in 3GPP TS 38.331, such as 3GPP TS 38.331 v15.8.0 or successor versions thereof, for example.

The active state, on the other hand, may be a state in which the UE is in a connected NAS state and in an active RRC state. The connected NAS state may correspond to a state in which the UE has an established NAS signaling connection with a CN node of the mobile communication system, such as a mobility management entity of the mobile communication system, like an AMF in case of a 5G network, for example. As such, the connected NAS state may correspond to a CM-CONNECTED state as defined in 3GPP TS 23.501, such as 3GPP TS 23.501 v16.1.0 or successor versions thereof. The active RRC state may correspond to a state in which the RRC connection of the UE is not suspended and, as such, the active RRC state may correspond to an RRC_CONNECTED state (the UE transits from the RRC_INACTIVE state to the RRC_CONNECTED state when the RRC connection is resumed after suspension) as defined in 3GPP TS 38.331, such as 3GPP TS 38.331 v15.8.0 or successor versions thereof, for example.

As NAS connectivity may generally be existent while the UE is in an inactive RRC state, it is noted that the inactive state may also correspond to states in which the UE is in a connected NAS state, on the one hand, but in an inactive RRC state, on the other hand, such as the "CM-CON-NECTED with RRC inactive state" as defined in 3GPP TS 23.501 (e.g., 3GPP TS 23.501 v16.1.0 or successor versions thereof). It may thus be summarized that, in the inactive state, the UE may be in at least one of an unconnected NAS state and an inactive RRC state and, in the active state, the UE may be in a connected NAS state and in an active RRC state.

Both the first session management entity and the second session management entity may be responsible for UE session management as well as the selection of gateway entities handling data transfer for the data session on the user plane and may correspond to SMFs in case of a 5G network, for example. The first and second gateway entities may be responsible for handling the data transfer for the data session on the user plane accordingly and may correspond to UPFs in case of a 5G network, for example. The data session associated with the UE may correspond to a logical connection between the UE and an endpoint in a data network (DN) behind the first and second gateway entities (e.g., through which the UE receives services) and may correspond to a PDU session in case of a 5G network, for example. The old and new sessions which handle the data session via the first and second gateway entities, respectively, may correspond to N4 sessions being established on the N4 interfaces between the respective SMFs and UPFs in case of a 5G network, for example. The old and new IP addresses assigned to the UE as part of the old and new sessions, respectively, may correspond to IPv4 (IP version 4) or IPv6 (IP version 6) addresses, for example.

As said, by deferring the provision of the new IP address to the UE until the UE enters the active state from the inactive state in accordance with step S306, the notification of the UE about the IP address change may be delayed as long as the UE is in the inactive state and unnecessary reactivations of the UE caused by the context transfer may thus be avoided. In a refinement, the new IP address may be provided to the UE after the UE has stopped generating or receiving (or simply "exchanging") traffic after becoming active again. Such state may also be denoted as silent state of the UE, in which the UE is in the active state but is not sending or receiving traffic anymore. Providing the new IP address to the UE while the UE is in the silent state may reduce the likelihood of packet loss at the UE which may be caused by the IP address change when the IP stack in the UE is changed just before a DL packet directed to the old IP address arrives at the UE. Also, as the UE may maintain connectivity to the network in the silent state (connectivity may generally be needed to convey the new IP address to the UE), providing the new IP address to the UE in the silent state may ensure that an additional procedure for reestablishing connectivity to the UE (requiring additional processing/battery on the UE side) may not be necessary.

As far as the forwarding of packets during the context transfer procedure is concerned, two possible implementations are considered herein, which are conceptually illustrated in FIG. 4. According to a first possible implementation (denoted as "Option 1" in the figure), DL packets directed to the old IP address arriving at the first gateway entity (denoted as "Old UPF" in the figure) may be forwarded to the second gateway entity (denoted "New UPF" in the figure) before they are delivered to the UE via a (Radio) Access Network, (R)AN, node such as a next generation NodeB (gNB) in a 5G network, via the air interface. In this implementation, the DL tunnel endpoint may need to be changed in the first gateway entity to point to the second gateway entity and, to this end, tunnel endpoint information identifying the second gateway entity may need to be provided to the first gateway entity to inform the first gateway entity where to forward the packets. In this implementation, the method performed by the second session management entity may thus further comprise, while the UE is in the inactive state, receiving, from the second gateway entity, tunnel endpoint information regarding the second gateway entity, and triggering providing the tunnel endpoint information to the first gateway entity, optionally via the first session management entity, requesting the first gateway entity to forward DL packets directed to the old IP address to the second gateway entity for further delivery to the UE.

In accordance with the first possible implementation, the first gateway entity may, once the tunnel endpoint information is received, establish a tunnel to the second gateway entity based on the tunnel endpoint information to forward packets directed to the old IP address to the second gateway entity for further delivery to the UE. The first gateway entity may thus receive DL packets directed to the old IP address, and trigger forwarding the DL packets to the second gateway entity via the tunnel for further delivery to the UE. Accordingly, the second gateway entity may receive, from the first gateway entity, DL packets directed to the old IP address, and trigger delivering the DL packets to the UE.

When the tunnel endpoint information is provided to the first gateway via the first session management entity, the tunnel endpoint information may be included in a context request for the data session sent from the second session management entity to the first session management entity (e.g., in an Nsmf_PDUSession_ContextRequest request sent from a new SMF to an old SMF). In this case, the context request for the data session may include a gateway change indication indicating to the first session management entity to request the first gateway entity to forward DL packets directed to the old IP address to the second gateway entity for further delivery to the UE. When the tunnel endpoint information is then further provided from the first session management entity to the first gateway entity, the tunnel endpoint information may be provided to the first gateway entity in a session release request to release the old session, for example.

According to a second possible implementation (denoted as "Option 2" in the figure), DL packets directed to the old IP address arriving at the first gateway entity ("Old UPF") may be forwarded directly to the (R)AN node, which may then deliver the DL packets to the UE. In this implementation, the first gateway entity may maintain forwarding DL packets directed to the old IP address according to a forwarding rule by which DL packets directed to the old IP address have been forwarded prior to providing the old IP address (besides the new IP address) to the second gateway entity. It will be understood that, while the second possible implementation ("Option 2") may not require new functionality on the side of the second gateway node for handling DL packets received from the first gateway entity and may additionally require less signaling, the first possible implementation ("Option 1") may be favorable when packet handling policies (that may be important if they are to change because of the context transfer) are to be properly applied and when reporting to the Policy Charging Function (PCF) in a 5G network, for example.

In the UL direction, as shown in FIG. 4, both the first possible implementation ("Option 1") and the second possible implementation ("Option 2") may handle the forwarding of packets in the same way, i.e., UL packets arriving from the UE at the (R)AN node may be forwarded to the second gateway entity ("New UPF"), instead of the first gateway entity ("old UPF"). To this end, the tunnel endpoint information of the second gateway entity may also be provided to the (R)AN node to inform the (R)AN node where to forward the UL packets arriving from the UE. The method performed by the second session management entity may thus further comprise, while the UE is in the inactive state, triggering providing the tunnel endpoint information to a mobility management entity (e.g., an AMF in case of a 5G network) requesting the mobility management entity to configure, using the tunnel endpoint information, a (R)AN node to forward UL packets arriving from the UE to the second gateway entity.

In order to avoid packet loss during the context transfer, the old session handling the data session via the first gateway entity, or at least the handling of packets associated with the old session in the first gateway entity, may need to be kept alive as long as the context transfer is not complete. To this end, the second session management entity may provide a time indication to the first gateway entity until which the first gateway entity is to temporarily keep its state related to the handling of the data session, especially with respect to the forwarding of (e.g., DL and UL) packets associated with the data session, which may also be denoted herein as the "packet forwarding state" of the first gateway entity. The time indication may lie beyond the expected time at which the UE is expected to enter the active state again. The method performed by the second session management entity may thus further comprise, while the UE is in the inactive state, triggering providing a time indication to the first gateway entity, optionally via the first session management entity, indicating a maintenance time until which a packet forwarding state associated with the old session is at least to be maintained by the first gateway entity. The maintenance time may correspond to an expected time at which the UE enters the active state from the inactive state.

When the old IP address is provided from the session management entity to the second gateway entity, the old IP address may be provided to the second gateway entity in a session modification request sent to the second gateway entity to modify the new session (e.g., in an N4 session modification request sent from the new SMF to the new UPF). The second session management entity itself, in turn, may be informed about the old IP address by the first session management entity. In the method performed by the second session management entity, the old IP address may thus be received from the first session management entity, optionally in a context of the data session received from the first session management entity (e.g., in a SM context included in an Nsmf_PDUSession_ContextRequest response sent from the old SMF to the new SMF).

As said, the context transfer from the first session management entity to the second session management entity may necessitate a change of the underlying gateway entity, i.e., from the first gateway entity to the second gateway entity. In one variant, the necessity of changing the first gateway entity to another gateway entity may be determined by the second session management entity itself and, therefore, the method performed by the second session management entity may further comprise, while the UE is in the inactive state and prior to triggering sending the session establishment request to the second gateway entity, triggering determining whether the context transfer necessitates changing the first gateway entity to another gateway entity operable with the second session management entity. The need for the gateway change may be inferred from a local configuration of the second session management entity, for example, from which the second session management entity may know that it cannot control the first gateway entity.

In another variant, the necessity of changing the first gateway entity to another gateway entity may be determined by an entity different from the second session management entity, and such entity may send a message including a gateway change indication to the second session management entity accordingly. Such different entity may be a mobility management entity of the mobile communication system (e.g., an AMF in case of a 5G network), for example, which may infer that the second session management entity is in a different service area requiring a gateway change. The different entity may also be the first session management entity, for example, which may implement a logic (e.g., based on a location attribute in an NF profile) to identify that the UE has moved too far away and thus a change in the gateway entity would be beneficial. From the viewpoint of the second session management entity, triggering determining whether the context transfer necessitates changing the first gateway entity to another gateway entity may thus include one of triggering determining a necessity of changing the first gateway entity to another gateway entity based on a change indication included in a message received by the second session management entity, and triggering determining a necessity of changing the first gateway entity to another gateway entity based on a configuration of the second session management entity. The message received by the second session management entity may be a context transfer request, for example (e.g., an Nsmf_PDUSession_CreateSMContext request sent from the AMF to the new SMF).

In order to complete the context transfer, the new IP address may need to be provided to the UE in accordance with step S306. Providing the new IP address to the UE may follow different procedures depending on whether the new IP address is an IPv4 or an IPv6 address. When the new IP address is an IPv6 address, the second session management entity may notify the UE of the availability of the new IP prefix. This may be performed using an IPv6 Router Advertisement message (as known from RFC 4861), for example, wherein the second session management entity may send a Router Advertisement to the UE via the second gateway entity with the new IP prefix. When the new IP address is an IPv6 address, triggering providing the new IP address to the UE may thus include triggering notifying the UE, optionally via the second gateway entity, that a new IPv6 prefix is available.

When the new IP address is an IPv4 address, on the other hand, there may be a need for session release and reestablishment to reallocate the IP address. In this case, the second session management entity may send an indication to a mobility management entity of the mobile communication system (e.g., an AMF in case of a 5G network) indicating that the mobility management entity should select the second session management entity when reestablishing the data session, so that the second session management entity is selected by the mobility management entity during subsequent session reestablishment. When the new IP address is an IPv4 address, triggering providing the new IP address to the UE may thus include triggering requesting a mobility management entity to select the second session management entity when performing a reestablishment procedure for the data session, and triggering performing a reestablishment procedure for the data session.

FIG. 5 illustrates a method which may be performed by the second gateway entity executed on the computing unit 210 according to the present disclosure. The method is dedicated to performing a context transfer from a first session management entity (e.g., the first session management entity executed on the computing unit 220) to a second session management entity (e.g., the second session management entity executed on the computing unit 200) in a mobile communication system, wherein the context transfer concerns a data session associated with a UE, wherein the data session is handled by the first session management entity via a first gateway entity (e.g., the first gateway entity executed on the computing unit 230) and wherein, after the context transfer, the data session is to be handled by the second session management entity via the second gateway entity. The operation of the second gateway entity may be complementary to the operation of the second session management entity described above in relation to FIG. 3 and, as such, aspects described above with regard to the operation of the second gateway entity may be applicable to the operation of the second gateway entity described in the following as well, and vice versa. Unnecessary repetitions are thus omitted in the following.

In step S502, the second gateway entity may receive, from the second session management entity, a session establishment request to establish a new session handling the data session via the second gateway entity. In step S504, the second gateway entity may trigger establishing the new session. In step S506, the second gateway entity may receive, from the second session management entity, an old IP address assigned to the UE as part of an old session handling the data session via the first gateway entity. In step S508, the second gateway entity may trigger assigning the old IP address to the UE as part of the new session, besides a new IP address assigned to the UE as part of the new session. Steps S502, S504, S506 and S508 may be performed while the UE is in an inactive state. The new IP address may be to be provided to the UE when the UE enters an active state from the inactive state.

As described above, in the inactive state, the UE may be in at least one of an unconnected NAS state and an inactive RRC state and, in the active state, the UE may be in a connected NAS state and in an active RRC state. The new IP address may be to be provided to the UE after the UE has stopped exchanging traffic. In one variant, the first gateway entity may maintain forwarding DL packets directed to the old IP address according to a forwarding rule by which DL packets directed to the old IP address have been forwarded prior to receiving the old IP address from the second session management entity. In another variant, the method may further comprise, while the UE is in the inactive state, triggering providing tunnel endpoint information regarding the second gateway entity to the second session management entity, wherein the tunnel endpoint information is to be provided to the first gateway entity, optionally via the first session management entity, requesting the first gateway entity to forward DL packets directed to the old IP address to the second gateway entity for further delivery to the UE. The method may further comprise receiving, from the first gateway entity, DL packets directed to the old IP address, and triggering delivering the DL packets to the UE. The old IP address may be received from the second session management entity in a session modification request to modify the new session.

FIG. 6 illustrates a method which may be performed by the first session management entity executed on the computing unit 220 according to the present disclosure. The method is dedicated to performing a context transfer from the first session management entity to a second session management entity (e.g., the second session management entity executed on the computing unit 200) in a mobile communication system, wherein the context transfer concerns a data session associated with a UE, wherein the data session is handled by the first session management entity via a first gateway entity (e.g., the first gateway entity executed on the computing unit 230) and wherein, after the context transfer, the data session is to be handled by the second session management entity via a second gateway entity (e.g., the second gateway entity executed on the computing unit 210). The operation of the first session management entity may be complementary to the operation of the second session management entity described above in relation to FIG. 3 and, as such, aspects described above with regard to the operation of the first session management entity may be applicable to the operation of the first session management entity described in the following as well, and vice versa. Unnecessary repetitions are thus omitted in the following.

In step S602, the first session management entity may trigger providing, to the second session management entity, an old IP address assigned to the UE as part of an old session handling the data session via the first gateway entity, wherein the old IP address is to be provided to the second gateway entity requesting the second gateway entity to assign the old IP address to the UE as part of a new session established by the second gateway entity for handling the data session via the second gateway entity, besides a new IP address assigned to the UE as part of the new session. Step S602 may be performed while the UE is in an inactive state. The new IP address may be to be provided to the UE when the UE enters an active state from the inactive state.

As described above, in the inactive state, the UE may be in at least one of an unconnected NAS state and an inactive RRC state and, in the active state, the UE is in a connected NAS state and in an active RRC state. The new IP address may be to be provided to the UE after the UE has stopped exchanging traffic. In one variant, the first gateway entity may maintain forwarding DL packets directed to the old IP address according to a forwarding rule by which DL packets directed to the old IP address have been forwarded prior to providing the old IP address to the second gateway entity. In another variant, the method may further comprise, while the UE is in the inactive state, receiving, from the second session management entity, tunnel endpoint information regarding the second gateway entity, and triggering providing the tunnel endpoint information to the first gateway entity requesting the first gateway entity to forward DL packets directed to the old IP address to the second gateway entity for further delivery to the UE. The tunnel endpoint information may be included in a context request for the data session sent from the second session management entity to the first session management entity. The context request for the data session may include a gateway change indication indicating to the first session management entity to request the first gateway entity to forward the packets directed to the old IP address to the second gateway entity for further delivery to the UE. The tunnel endpoint information may be provided to the first gateway entity in a session release request to release the old session.

The method may further comprise, while the UE is in the inactive state, receiving, from the second session management entity, a time indication indicating a maintenance time until which a packet forwarding state associated with the old session is at least to be maintained by the first gateway entity, and triggering providing the time indication to the first gateway entity. The maintenance time may correspond to an expected time at which the UE enters the active state from the inactive state. The old IP address may be sent to the second session management entity in a context of the data session. The method may further comprise, while the UE is in the inactive state and prior to providing the old IP address to the second session management entity, triggering determining whether the context transfer necessitates changing the first gateway entity to another gateway entity operable with the second session management entity. The method may further comprise, while the UE is in the inactive state, when it is determined that the context transfer necessitates changing the first gateway entity to another gateway entity, triggering sending a message to the second session management entity, the message including a gateway change indication.

FIG. 7 illustrates a method which may be performed by the first gateway entity executed on the computing unit 230 according to the present disclosure. The method is dedicated to performing a context transfer from a first session management entity (e.g., the first session management entity executed on the computing unit 220) to a second session management entity (e.g., the second session management entity executed on the computing unit 200) in a mobile communication system, wherein the context transfer concerns a data session associated with a UE, wherein the data session is handled by the first session management entity via the first gateway entity and wherein, after the context transfer, the data session is to be handled by the second session management entity via a second gateway entity (e.g., the second gateway entity executed on the computing unit 210). The operation of the first gateway entity may be complementary to the operation of the first session management entity described above in relation to FIG. 6 and, as such, aspects described above with regard to the operation of the first gateway entity may be applicable to the operation of the first gateway entity described in the following as well, and vice versa. Unnecessary repetitions are thus omitted in the following.

In step S702, the first gateway entity may receive, from the first session management entity, a session release request to release an old session handling the data session via the first gateway entity, wherein an old IP address is assigned to the UE as part of the old session, the old IP address being provided to the second gateway entity requesting the second gateway entity to assign the old IP address to the UE as part of a new session being established by the second gateway entity for handling the data session via the second gateway entity, besides a new IP address assigned to the UE as part of the new session. In step S704, the first gateway entity may maintain a packet forwarding state associated with the old session at least until an expected time at which the UE enters an active state from the inactive state. Steps S702 and S704 may be performed while the UE is in an inactive state. The new IP address may be to be provided to the UE when the UE enters an active state from the inactive state.

As described above, in the inactive state, the UE may be in at least one of an unconnected NAS state and an inactive RRC state and, in the active state, the UE may be in a connected NAS state and in an active RRC state. The new IP address may be to be provided to the UE after the UE has stopped exchanging traffic. In one variant, the method may further comprise maintaining forwarding DL packets directed to the old IP address according to a forwarding rule by which DL packets directed to the old IP address have been forwarded prior to providing the old IP address to the second gateway entity. In another variant, the method may further comprise, while the UE is in the inactive state, receiving, from the first session management entity, tunnel endpoint information regarding the second gateway entity, and establishing a tunnel to the second gateway entity based on the tunnel endpoint information to forward packets directed to the old IP address to the second gateway entity for further delivery to the UE. The tunnel endpoint information may be received in the session release request. The method may further comprise receiving DL packets directed to the old IP address, and triggering forwarding the DL packets to the second gateway entity via the tunnel for further delivery to the UE. The method may further comprise, while the UE is in the inactive state, receiving a time indication from the first session management entity indicating a maintenance time until which a packet forwarding state associated with the old session is at least to be maintained, wherein the packet forwarding state associated with the old session may be maintained until the maintenance time. The maintenance time may correspond to the expected time at which the UE enters the active state from the inactive state.

Figure 8:
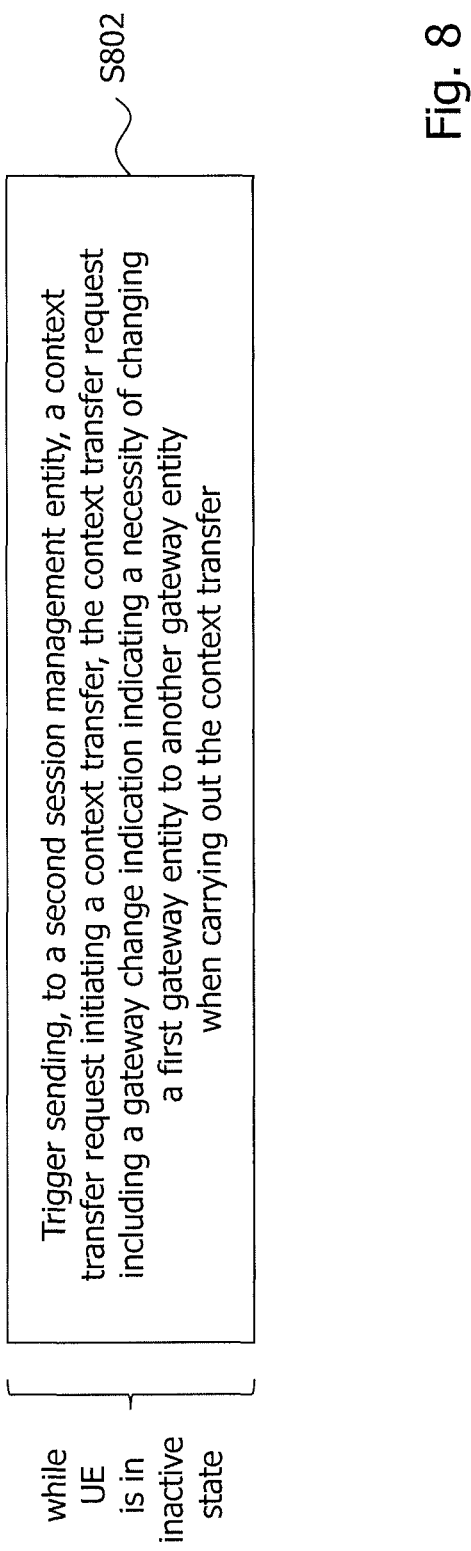
FIG. 8 illustrates a method which may be performed by the mobility management entity according to the present disclosure.

FIG. 8 illustrates a method which may be performed by the mobility management entity executed on the computing unit 240 according to the present disclosure. The method is dedicated to performing a context transfer from a first session management entity (e.g., the first session management entity executed on the computing unit 220) to a second session management entity (e.g., the second session management entity executed on the computing unit 200) in a mobile communication system, wherein the context transfer concerns a data session associated with a UE, wherein the data session is handled by the first session management entity via a first gateway entity (e.g., the first gateway entity executed on the computing unit 230) and wherein, after the context transfer, the data session is to be handled by the second session management entity via a second gateway entity (e.g., the second gateway entity executed on the computing unit 210). The operation of the mobility management entity may be complementary to the operation of the second session management entity described above in relation to FIG. 3 and, as such, aspects described above with regard to the operation of the mobility management entity may be applicable to the operation of the mobility management entity described in the following as well, and vice versa. Unnecessary repetitions are thus omitted in the following.

In step S802, the mobility management entity may trigger sending, to the second session management entity, a context transfer request initiating the context transfer, the context transfer request including a gateway change indication indicating a necessity of changing the first gateway entity to another gateway entity when carrying out the context transfer. Step S802 may be performed while the UE is in an inactive state.

As described above, in the inactive state, the UE may be in at least one of an unconnected NAS state and an inactive RRC state. The method may further comprise, when the UE enters an active state from the inactive state, receiving, from the second session management entity, a request to select the second session management entity when performing a reestablishment procedure for the data session. In the active state, the UE may be in a connected NAS state and in an active RRC state. The method may further comprise, while the UE is in the inactive state, receiving, from the second session management entity, tunnel endpoint information regarding the second gateway entity, and triggering configuring, using the tunnel endpoint information, a (R)AN node to forward UL packets arriving from the UE to the second gateway entity.

In the following, exemplary implementations of the technique described above will be presented in order to elucidate the principles of the technique with further details.

Figure 9A:
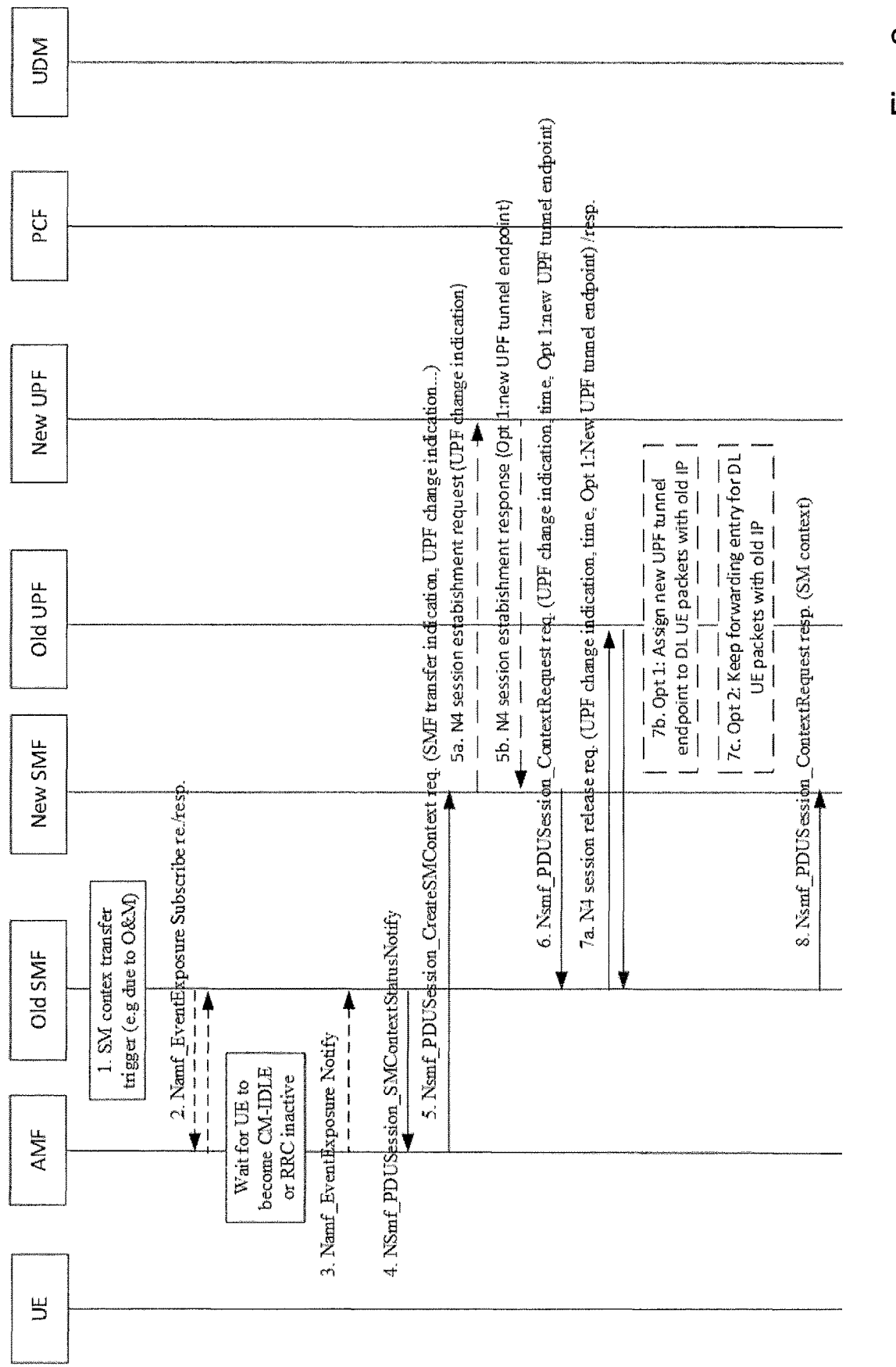
FIGS. 9a and 9b illustrate a signaling diagram of an exemplary interaction between entities of a mobile communication system according to the present disclosure.
Figure 9B:
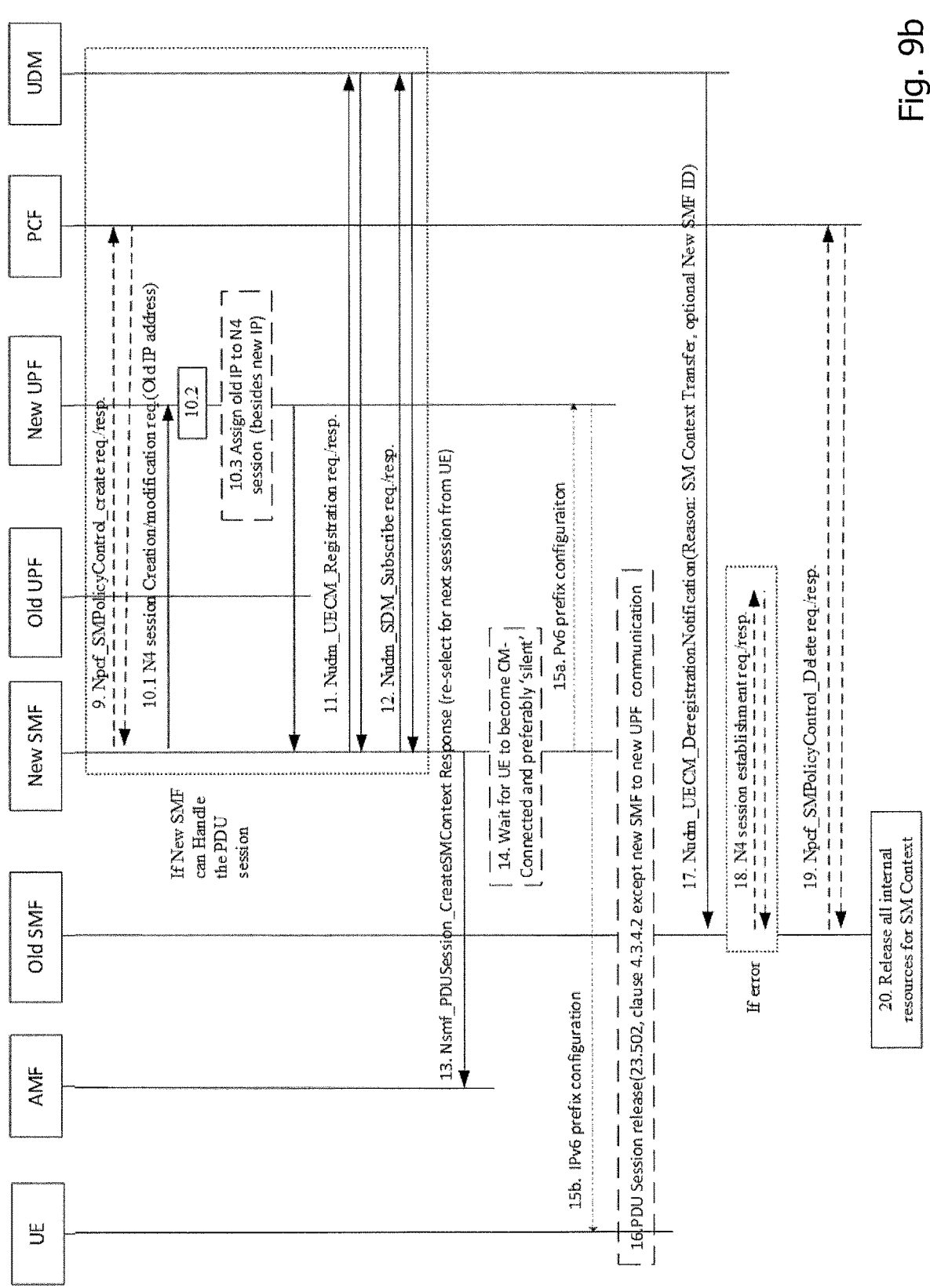

FIGS. 9a and 9b illustrate a signaling diagram of an exemplary interaction between entities of a mobile communication system according to the present disclosure. The signaling diagram is based on the method of FIGS. 1a and 1b and is extended by the functions of the technique presented herein. In order to avoid repetitions, reference will in the following only made to those steps of the method which differ from the method of FIGS. 1a and 1b. Although the signaling diagram is presented as an example including an old SMF, a new SMF, an old UPF, a new UPF and an AMF as entities of a 5G network, it will be understood that the principles described in the following may be practiced in any other mobile communication system with other types of first/second session management entities, first/second gateway entities and mobility management entities as well.

In step 5, the AMF may, after the UE has become CM-IDLE or RRC inactive (i.e., has entered the inactive state in the sense of the present disclosure) and the actual context transfer procedure has been triggered by the old SMF in step 4, infer that the new SMF is in a different service area requiring a gateway change and therefore send a UPF change indication to the new SMF in the Nsmf_P-DUSession_CreateSMContext request, indicating a necessity to change the old UPF to a new UPF during the context transfer. In step 5a, the new SMF may select a new UPF accordingly and establish a (void) N4 session with it by sending an N4 session establishment request to the new UPF. As part of the request, the new SMF may also include a UPF change indication. In step 5b, the new UPF may reply with an N4 session establishment response including common parameters, such as a UL tunnel endpoint IP and a Tunnel Endpoint Identifier (TEID) of the (R)AN node (not shown). The response may additionally include the tunnel endpoint information (e.g., tunnel endpoint identifiers) which identify the new UPF that is to be used by the old UPF when forwarding DL packets directed to the old UE IP address (corresponding to "Option 1" above). In case the new IP address of the UE is selected by the new UPF, the new IP address may be included in the response as well. Otherwise, the new SMF may select the new IP address of the UE and send it to the new UPF in step 5a.

In step 6, the new SMF may send the UPF change indication to the old SMF as part of the Nsmf_PDUSession_ContextRequest request, including the tunnel endpoint information for the new UPF if "Option 1" is used. In step 7a, the old SMF may issue an N4 session release request to the old UPF, which may include the UPF change indication (e.g., instead of a flag for the expected reestablishment) as well as a time indication indicating a maintenance time until which the old UPF shall temporarily keep the states related to the handling of the UE PDU session. This point of time should be beyond the expected time at which the UE is expected to enter the active state from the inactive state. In the request, the old SMF may also include the tunnel endpoint information for the new UPF if "Option 1" is used. In step 7b, applied in case of "Option 1", the old UPF may set up a tunnel for the old IP address is accordingly to temporarily forward DL packets corresponding to the PDU session of the UE to the new UPF. Alternatively, in step 7c, applied in case of "Option 2", the old UPF may keep a forwarding rule (e.g., a forwarding table entry) to forward DL packets directed to the old UE IP address to the (R)AN node as destination. The forwarding rule may be kept until the maintenance time received in step 7a is lapsed, for example. It is to be noted in this regard that the N4 session may need to be maintained with the old SMF as long as there is a state in the old UPF requiring the forwarding of packets to the new UPF, and may need to be removed from the old UPF only after the UE PDU session has definitely been transferred to the new SMF. As such forwarding state may not harm as long as the old UPF does not reallocate the old IP address, a timer configured with the maintenance time may be started in the old UPF when the packet forwarding state is installed, and the old IP address may then be reserved and the forwarding state may be kept until the timer expires. When the timer expires, all states may be released in the old UPF autonomously, thereby making possible that the old SMF may be decommissioned before the UE enters the active state again.

In step 8, when sending an Nsmf_PDUSession_ContextRequest response to the new SMF, the old SMF may include the requested SM context containing the information needed for the context transfer. While the SM context may also include the old UE IP address, it will be understood that the old IP address could also be transferred separately from the SM context, for example. In step 10.1, the new SMF may send (among other parameters) the old IP address to the new UPF in an N4 session modification request relating to the previously established N4 session and, in step 10.3, the new UPF may (temporarily) assign the old IP address besides the new UE IP address to the PDU session, so that packets arriving at the new UPF with the old IP address will be handled in the same way as those with the new IP address. If the new IP address is an IPv4 address, there may be a need for session release and reestablishment to reallocate the IP address and, therefore, when sending an Nsmf_PDUSession_CreateSMContext response to the AMF in step 13, the new SMF may include an indication to the AMF indicating to the AMF that it shall select the new SMF when reestablishing the PDU session for the forthcoming request from the UE. In the Nsmf_PDUSession_CreateSMContext response, the new SMF may include the tunnel endpoint information identifying the new UPF to which the (R)AN node shall forward UL packets in this UE PDU session. Based on the tunnel endpoint information, the AMF may then initiate signaling on the N2 interface to the (R)AN node to update/configure the (R)AN node's UL tunnel endpoint accordingly (not shown).

In step 14, the new SMF may wait until the UE enters the active state (in which it may send or receive packets and may therefore issue a service request) and, beyond that, the new SMF may preferably wait until the UE enters the silent state in which the UE does not exchange any traffic, e.g., for a preconfigured amount of time. If the UE is in the inactive RRC state, the new SMF may not need to wait. When the new IP address is an IPv6 address, the new SMF may notify, in steps 15a and 15b, the UE of the availability of the new IP prefix, which may be performed using an IPv6 Router Advertisement message (RFC 4861), wherein the new SMF may send a Router Advertisement to the UE via the new UPF with the new prefix configuration. When the new IP address is an IPv4 address, on the other hand, a session release and reestablishment may be needed to reallocate the IP address, as described above, and a PDU session release and reestablishment procedure may thus be carried out in step 16 (e.g., triggered by the new SMF). During this procedure, the new SMF will be selected by the AMF for the new session in accordance with the indication of step 13, and the preconfigured user plane path will be used accordingly. To this end, the procedure defined in section 4.2.4.3 of 3GPP TS 23.502 (e.g., 3GPP TS 23.502 v16.1.1 or successor versions thereof) may be applied, for example, with the exception that there may be no need for further interaction between the new SMF and the new UPF and neither between the new SMF and PCF/UDM. The subsequent steps 17 to 20 may correspond to steps 14 to 17 of FIGS. 1a and 1b.

Figure 10:
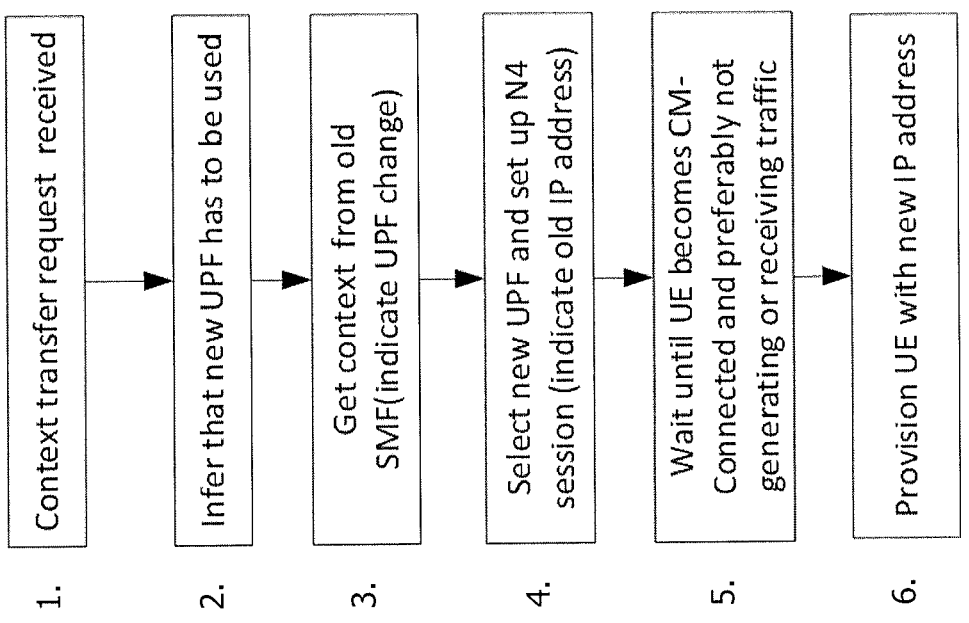
FIG. 10 illustrates an exemplary method from the viewpoint of a second session management entity according to the present disclosure.

FIG. 10 illustrates an exemplary method from the viewpoint of the second session management entity according to the present disclosure, such as the new SMF of FIGS. 9a and 9b, for example. In step 1, the new SMF may receive a context transfer request and, in step 2, the new SMF may infer (e.g., from the request or autonomously) that the context transfer is not possible when the old UPF is kept. Instead of refusing the context transfer (as it may happen in the prior art procedure of FIGS. 1a and 1b), the new SMF may initiate, in step 3, the context transfer and get the context from the old SMF, wherein optionally a UPF change attribute may be used to indicate that a UPF change will be needed. In step 4, the new SMF may then select the new UPF and set up an N4 session corresponding to the UE PDU session. Here, the old IP address may be indicated to the new UPF and may be used by the new UPF to handle the UE traffic until the UE is notified of the new IP address. In step 5, the new SMF may wait until the UE enters the active state (e.g., becomes CM-CONNECTED) and, preferably, until the UE enters the silent state in which it may terminate the messaging because of which it has become active. In step 6, the UE may then be provisioned with the new IP address, as described above.

As has become apparent from the above, the present disclosure provides a technique for performing a context transfer from a first session management entity to a second session management entity in a mobile communication system which requires a change of the underlying gateway entity. The technique may be considered as an extension to the SMF context transfer procedure known from FIGS. 1a and 1b which additionally enables an (e.g., anchor) UPF change (implying a UE IP address change). Changing the UPF may happen while the UE is in an inactive state and the notification of the UE about the change of the IP address may be delayed until after the UE becomes active again, in order to thereby avoid reactivation of the UE due to the context transfer. Involved inactive UEs may thus not be awakened during the context transfer, which may especially be relevant for long sleeping IoT devices, for example. Before notifying the new IP address to the UE, traffic may be sent to/from the UE by temporarily "borrowing" the old IP address by the new UPF, so that the new session at the new UPF may identify UE packets with the old IP address until the new UE IP address becomes fully operable. DL packets directed to the old IP address may be forwarded by the old UPF to the new UPF or directly to the (R)AN.

Figure 1B:
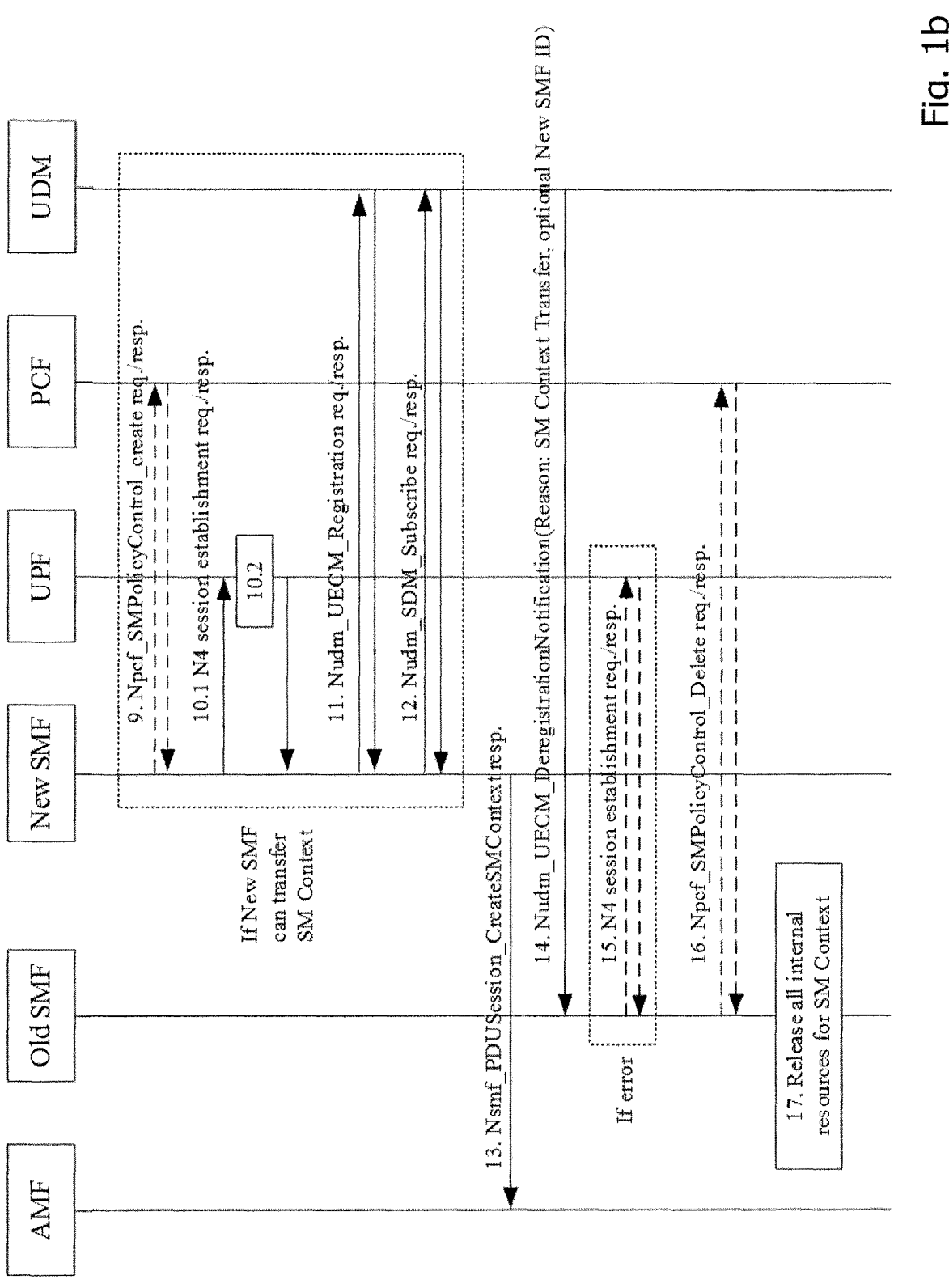

The presented technique may thus enable PDU session context transfer also for cases when the anchor UPF needs to be changed, generally by leveraging the context transfer procedure according to FIGS. 1a and 1b proposed by 3GPP with only little additional procedural needs. While it will be understood that the additional procedural needs may become standardized (e.g., in a 3GPP standard), it may also be conceivable to apply only a portion of the aspects of the presented technique in the form of proprietary implementations, such as a proprietary implementation in the new SMF only, wherein the other entities, such as the old SMF and the AMF, may not support the functionalities described herein, for example. While it will be understood that a standardization of the additional procedural needs described herein may be necessary to take the full benefit of the presented technique, such proprietary implementations may still be considered expedient for certain scenarios. As an example, in case of a proprietary implementation in the new SMF only, as described above, the old SMF may not be able to manage setting up the forwarding of DL packets directed to the old IP address from the old UPF to the new UPF ("Option 1" above), which means that DL messages may be lost. However, while such implementation may not be expedient in cases when it is expected that an Application Function (AF) initiates the communication to the UE, it may still be usable when the UE generally initiates the communication (note: in the majority of messages MTC scenarios, it may be expected that the UE (e.g., sensors) initiate the communication). As another example, it may be required for IPv4 devices that the AMF is configured (or may fetch related configurations from the UDM/PCF) with a "prefer last use" local policy to preferably reselect the new SMF for IPv4 session reestablishment. This may likely be doable in present AMFs because there may be many reasons for UE connectivity being temporarily broken (and thus sessions being lost) and the fastest and simplest way to reestablish the session may be via the "previously selected" SMF (note: the state may be still available and also the UPF may be able to reallocate the same UE IP address). As a still further example, if—in case of a proprietary implementation in the new SMF only, as described above—the new UPF does not implement the enhanced functionality described herein, the new UPF may not be able to handle the UE uplink traffic directed to the old IP address, meaning that these messages may be lost. For mission-critical communication, if there is an acknowledgment from the AF, these messages may be repeated. For free-to-ignore messages, however, such message loss may not be a problem depending on the use case (note: the chances that the new SMF and the new UPF are from the same vendor in the same service area are relatively high).

Finally, it is noted that the context transfer procedure presented herein may also be triggered by a UE registration request to an AMF, for example, in which case steps 1 to 4 shown in FIGS. 1a and 1b as well as FIGS. 9a and 9b may be omitted. In other words, the trigger of the context transfer may also be caused by nomadic UEs registering to a new service area. For these cases, 3GPP TS 23.502 (e.g., section 4.23.3 of 3GPP TS 23.502 v16.1.1) defines complex procedures for UE Triggered Service Requests with I-SMF insertion/change. These procedures may be avoided by the technique presented herein because, according to the presented technique, no I-SMF may need to be inserted or changed. More specifically, when a UE registration triggers a PDU session context transfer, the forthcoming service request may not require the insertion or a change of an I-SMF because the session context is already transferred to a new SMF in the service area. Instead, a new SMF may be selected and the context transfer may be triggered from the old SMF to the new SMF, which may eventually result in a simplified CN system having less user/control plane nodes for the involved PDU sessions (i.e., no I-SMF may be needed).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for performing a context transfer from a first session management entity to a second session management entity in a mobile communication system, the context transfer concerning a data session associated with a User Equipment (UE), the data session handled by the first session management entity via a first gateway entity and, after the context transfer, the data session handled by the second session management entity via a second gateway entity, the method being performed by the second session management entity and comprising:

while the UE is in an inactive state:

triggering sending, to the second gateway entity, a session establishment request to establish a new session handling the data session via the second gateway entity;

triggering providing, to the second gateway entity, an old Internet Protocol (IP) address assigned to the UE as part of an old session handling the data session via the first gateway entity, and requesting the second gateway entity to assign the old IP address to the UE as part of the new session, besides a new IP address assigned to the UE as part of the new session;

receiving, from the second gateway entity, tunnel endpoint information regarding the second gateway entity, the tunnel endpoint information comprising a tunnel endpoint identifier of a radio access node and the second gateway entity that is to be used by the first gateway entity; and triggering providing the tunnel endpoint information to the first gateway entity and requesting the first gateway entity to forward DL packets directed to the old IP address to the second gateway entity for further delivery to the UE; and when the UE enters an active state from the inactive state, triggering providing the new IP address to the UE.

2. The method of claim 1, wherein, in the inactive state, the UE is in at least one of an unconnected Non-Access Stratum (NAS) state and an inactive Radio Resource Control (RRC) state and wherein, in the active state, the UE is in a connected NAS state and in an active RRC state.

3. The method of claim 1, wherein triggering providing the new IP address to the UE is performed after the UE has stopped exchanging traffic.

4. The method of claim 1, wherein the first gateway entity maintains forwarding downlink (DL) packets directed to the old IP address according to a forwarding rule by which DL packets directed to the old IP address have been forwarded prior to providing the old IP address to the second gateway entity.

5. The method of claim 1, wherein the tunnel endpoint information is provided to the first gateway entity via the first session management entity, and wherein the tunnel endpoint information is included in a context request for the data session sent from the second session management entity to the first session management entity.

6. The method of claim 5, wherein the context request for the data session includes a gateway change indication indicating to the first session management entity to request the first gateway entity to forward DL packets directed to the old IP address to the second gateway entity for further delivery to the UE.

7. The method of claim 1, further comprising, while the UE is in the inactive state, triggering providing the tunnel endpoint information to a mobility management entity requesting the mobility management entity to configure, using the tunnel endpoint information, an Access Network (AN) node to forward uplink (UL) packets arriving from the UE to the second gateway entity.

8. The method of claim 1, further comprising, while the UE is in the inactive state, triggering providing a time indication to the first gateway entity, optionally via the first session management entity, indicating a maintenance time until which a packet forwarding state associated with the old session is at least to be maintained by the first gateway entity.

9. The method of claim 1, wherein the old IP address is provided to the second gateway entity in a session modification request sent to the second gateway entity to modify the new session.

10. A method for performing a context transfer from a first session management entity to a second session management entity in a mobile communication system, the context transfer concerning a data session associated with a User Equipment (UE) the data session handled by the first session management entity via a first gateway entity and, after the context transfer, the data session handled by the second session management entity via a second gateway entity, the method being performed by the second gateway entity and comprising:

while the UE is in an inactive state:

receiving, from the second session management entity, a session establishment request to establish a new session handling the data session via the second gateway entity;

triggering establishing the new session;

receiving, from the second session management entity, an old Internet Protocol (IP) address assigned to the UE as part of an old session handling the data session via the first gateway entity;

receiving, from the second gateway entity, tunnel endpoint information regarding the second gateway entity, the tunnel endpoint information comprising a tunnel endpoint identifier of a radio access node and the second gateway entity that is to be used by the first gateway entity; and triggering providing the tunnel endpoint information to the first gateway entity and requesting the first gateway entity to forward DL packets directed to the old IP address to the second gateway entity for further delivery to the UE; and triggering assigning the old IP address to the UE as part of the new session, besides a new IP address assigned to the UE as part of the new session, the new IP address provided to the UE when the UE enters an active state from the inactive state.

11. The method of claim 10, wherein, in the inactive state, the UE is in at least one of an unconnected Non-Access Stratum (NAS) state and an inactive Radio Resource Control (RRC) state and wherein, in the active state, the UE is in a connected NAS state and in an active RRC state.

12. The method of claim 10, wherein the new IP address is to be provided to the UE after the UE has stopped exchanging traffic.

13. The method of claim 10, wherein the first gateway entity maintains forwarding downlink (DL) packets directed to the old IP address according to a forwarding rule by which DL packets directed to the old IP address have been forwarded prior to receiving the old IP address from the second session management entity.

14. The method of claim 10, further comprising:

receiving, from the first gateway entity, DL packets directed to the old IP address; and triggering delivering the DL packets to the UE.

15. The method of claim 10, wherein the old IP address is received from the second session management entity in a session modification request to modify the new session.

16. A method for performing a context transfer from a first session management entity to a second session management entity in a mobile communication system, the context transfer concerning a data session associated with a User Equipment (UE), the data session handled by the first session management entity via a first gateway entity and, after the context transfer, the data session handled by the second session management entity via a second gateway entity, the method being performed by the first session management entity and comprising:

while the UE is in an inactive state:

triggering providing, to the second session management entity, an old Internet Protocol (IP) address assigned to the UE as part of an old session handling the data session via the first gateway entity, the old IP address is to be provided to the second gateway entity requesting the second gateway entity to assign the old IP address to the UE as part of a new session established by the second gateway entity for handling the data session via the second gateway entity, besides a new IP address assigned to the UE as part of the new session, the new IP address provided to the UE when the UE enters an active state from the inactive state;

receiving, from the second gateway entity, tunnel endpoint information regarding the second gateway entity, the tunnel endpoint information comprising a tunnel endpoint identifier of a radio access node and the second gateway entity that is to be used by the first gateway entity; and triggering providing the tunnel endpoint information to the first gateway entity and requesting the first gateway entity to forward DL packets directed to the old IP address to the second gateway entity for further delivery to the UE.

17. The method of claim 16, wherein, in the inactive state, the UE is in at least one of an unconnected Non-Access Stratum (NAS) state and an inactive Radio Resource Control (RRC) state and wherein, in the active state, the UE is in a connected NAS state and in an active RRC state.

18. A method for performing a context transfer from a first session management entity to a second session management entity in a mobile communication system, the context transfer concerning a data session associated with a User Equipment (UE) the data session handled by the first session management entity via a first gateway entity and, after the context transfer, the data session handled by the second session management entity via a second gateway entity, the method being performed by the first gateway entity and comprising:

while the UE is in an inactive state:

receiving, from the first session management entity, a session release request to release an old session handling the data session via the first gateway entity, an old Internet Protocol (IP) address assigned to the UE as part of the old session, the old IP address being provided to the second gateway entity requesting the second gateway entity to assign the old IP address to the UE as part of a new session being established by the second gateway entity for handling the data session via the second gateway entity, besides a new IP address assigned to the UE as part of the new session, the new IP address provided to the UE when the UE enters the active state from the inactive state;

receiving, from the second gateway entity, tunnel endpoint information regarding the second gateway entity, the tunnel endpoint information comprising a tunnel endpoint identifier of a radio access node and the second gateway entity that is to be used by the first gateway entity; and triggering providing the tunnel endpoint information to the first gateway entity and requesting the first gateway entity to forward DL packets directed to the old IP address to the second gateway entity for further delivery to the UE; and maintaining a packet forwarding state associated with the old session at least until an expected time at which the UE enters an active state from the inactive state.

* * * * *